US009071804B2

(12) United States Patent
Sumitomo et al.

(10) Patent No.: US 9,071,804 B2
(45) Date of Patent: Jun. 30, 2015

(54) TELEVISION RECEIVER AND ELECTRONIC APPARATUS HOUSING WITH SUPPORT

(75) Inventors: Sotaro Sumitomo, Tokyo (JP); Minoru Enomoto, Tokyo (JP); Hidehiko Sudo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 386 days.

(21) Appl. No.: 13/593,450

(22) Filed: Aug. 23, 2012

(65) Prior Publication Data

US 2013/0070160 A1  Mar. 21, 2013

(30) Foreign Application Priority Data

Sep. 15, 2011  (JP) .................................. 2011-202450

(51) Int. Cl.
*H04N 5/64*  (2006.01)
*H04N 5/655*  (2006.01)

(52) U.S. Cl.
CPC ..................................... *H04N 5/655* (2013.01)

(58) Field of Classification Search
USPC .............. 348/794, 825; 248/291.1, 917, 919, 248/922, 923; 361/679.21, 679.22
See application file for complete search history.

(56) References Cited

U.S. PATENT DOCUMENTS

| | | | |
|---|---|---|---|
| 6,268,997 B1 * | 7/2001 | Hong ........................ | 361/679.07 |
| 6,502,792 B1 * | 1/2003 | Cho et al. ..................... | 248/121 |
| 6,581,893 B1 * | 6/2003 | Lu ................................ | 248/291.1 |
| 6,727,961 B2 * | 4/2004 | Yang .............................. | 349/58 |
| 7,046,310 B2 * | 5/2006 | Lee ................................ | 348/836 |
| 7,232,098 B2 * | 6/2007 | Rawlings et al. ............. | 248/121 |
| 7,245,481 B2 * | 7/2007 | Shimizu et al. ............ | 361/679.08 |
| 7,274,556 B2 * | 9/2007 | Chung ....................... | 361/679.27 |
| 7,515,222 B2 * | 4/2009 | Yamanaka ...................... | 349/58 |
| 7,567,436 B2 * | 7/2009 | Jeong ........................ | 361/679.22 |
| 7,611,103 B2 * | 11/2009 | Ha et al. ...................... | 248/125.2 |
| 7,651,062 B2 * | 1/2010 | Matsutani et al. .......... | 248/176.3 |
| 7,819,368 B2 * | 10/2010 | Jung et al. ..................... | 248/133 |
| 8,520,371 B2 * | 8/2013 | Peng et al. ................ | 361/679.01 |

FOREIGN PATENT DOCUMENTS

| | | |
|---|---|---|
| JP | 3-60718 U | 6/1991 |
| JP | 2005-191272 A | 7/2005 |
| JP | 2006-173849 A | 6/2006 |
| WO | WO 99/10860 | 3/1999 |

OTHER PUBLICATIONS

Notice of Rejection mailed Nov. 13, 2012 in corresponding Japanese Patent Application No. 2011-202450 in three (3) pages.

* cited by examiner

*Primary Examiner* — Victor Kostak
(74) *Attorney, Agent, or Firm* — Knobbe, Martens, Olson & Bear LLP

(57) ABSTRACT

According to one embodiment, a television receiver includes: a display device comprising a display screen and a rear surface at a side opposite to the display screen; a housing accommodating the display device; a support supporting the housing at a side of the rear surface of the display device; a first member in the housing at the side of the rear surface of the display device; a joint joining the support and the first member; and a second member in the housing, the second member being configured to cover the side of the rear surface of the display device, the second member comprising an opening from which at least a part of the first member is exposed and an extending portion located between the support and the first member and extending between edges of the opening, the opening being configured to accommodate at least a part of the joint.

7 Claims, 30 Drawing Sheets

TELEVISION RECEIVER AND ELECTRONIC APPARATUS HOUSING WITH SUPPORT

CROSS-REFERENCE TO RELATED APPLICATIONS

This application is based upon and claims the benefit of priority from Japanese Patent Application No. 2011-202450, filed on Sep. 15, 2011, the entire contents of which are incorporated herein by reference.

FIELD

Embodiments described herein relate generally to a television receiver and an electronic apparatus.

BACKGROUND

Conventionally widely known are electronic apparatuses in which a housing that accommodates a display device is supported by a support that is placed on an installation surface.

In such an electronic apparatus including a television receiver, it is desired to increase the rigidity of the housing.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
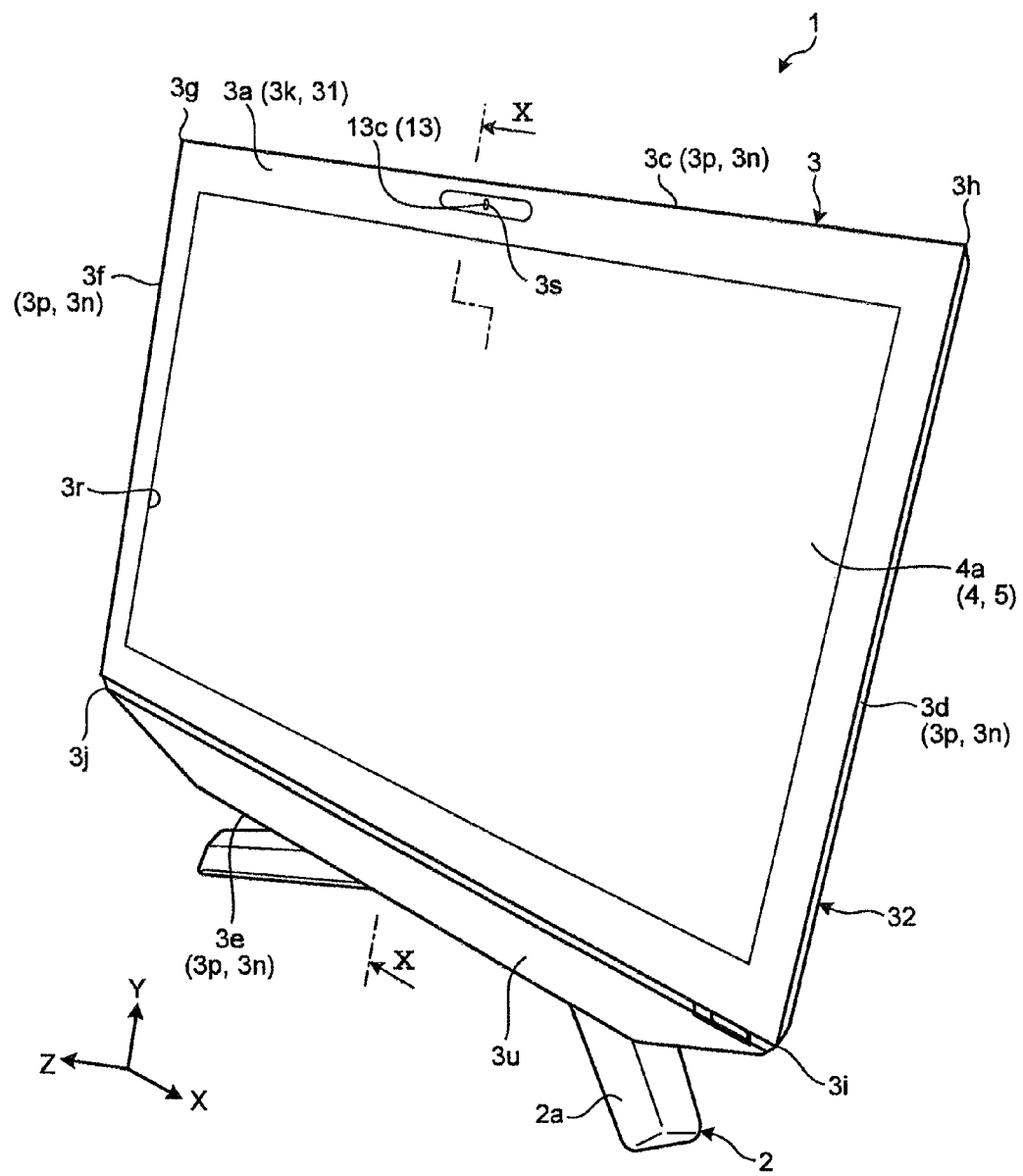
FIG. 1 is an exemplary perspective view illustrating an example of a television receiver according to an embodiment when seen from the front side.

In general, according to one embodiment, a television receiver includes: a display device comprising a display screen and a rear surface at a side opposite to the display screen; a housing configured to accommodate at least a part of the display device; a support configured to support the housing at a side of the rear surface of the display device; a first member provided in the housing and located at the side of the rear surface of the display device; a joint configured to join the support and the first member; and a second member provided in the housing, the second member being configured to cover the side of the rear surface of the display device, the second member comprising an opening from which at least a part of the first member is exposed and an extending portion located between the support and the first member and extending between edges of the opening, the opening being configured to accommodate at least a part of the joint.

In the following plurality of exemplary embodiments and variations, the same constituent components are included. Therefore, in the following description, a common reference numeral denotes the same constituent components and overlapping description thereof is not repeated. Furthermore, directions (X direction, Y direction, Z direction) are illustrated for convenience in the drawings. The X direction indicates a longitudinal direction of a housing 3 of a television receiver 1 when a display screen 4a is seen from the front side. The Y direction indicates the transverse direction thereof when the display screen 4a is seen from the front side. The Z direction indicates a front-rear direction (depth direction, thickness direction of the housing 3) thereof when the display screen 4a is seen from the front side. The X direction, the Y direction, and the Z direction are perpendicular to one another.

Furthermore, in the following embodiment, a case where an electronic apparatus is configured as a television receiver is described. However, an electronic apparatus according to the embodiment is not limited thereto. The electronic apparatus according to the embodiment can be configured as various electronic apparatuses such as a tablet-type or slate-type personal computer, a smart phone, a smart television, a smart book, a mobile phone, a personal digital assistant (PDA), a video display device, and a video phone.

The television receiver 1 comprises a support 2 (stand section, stand, leg section) and the housing 3. The housing 3 accommodates at least a part of a display device 4. The support 2 supports the housing 3. In the embodiment, the support 2 supports the housing 3 through a hinge 8 (see FIG. 29) in a rotationally movable manner, as an example. In the embodiment, the hinge 8 changes an angle of the display screen 4a in an up-down direction, as an example. That is to say, the hinge 8 can adjust tilt. It is to be noted that the support 2 can support the housing 3 in such a manner that rotational movement (pivot, swivel, for example) of the housing 3 in another direction can be realized.

Figure 2:
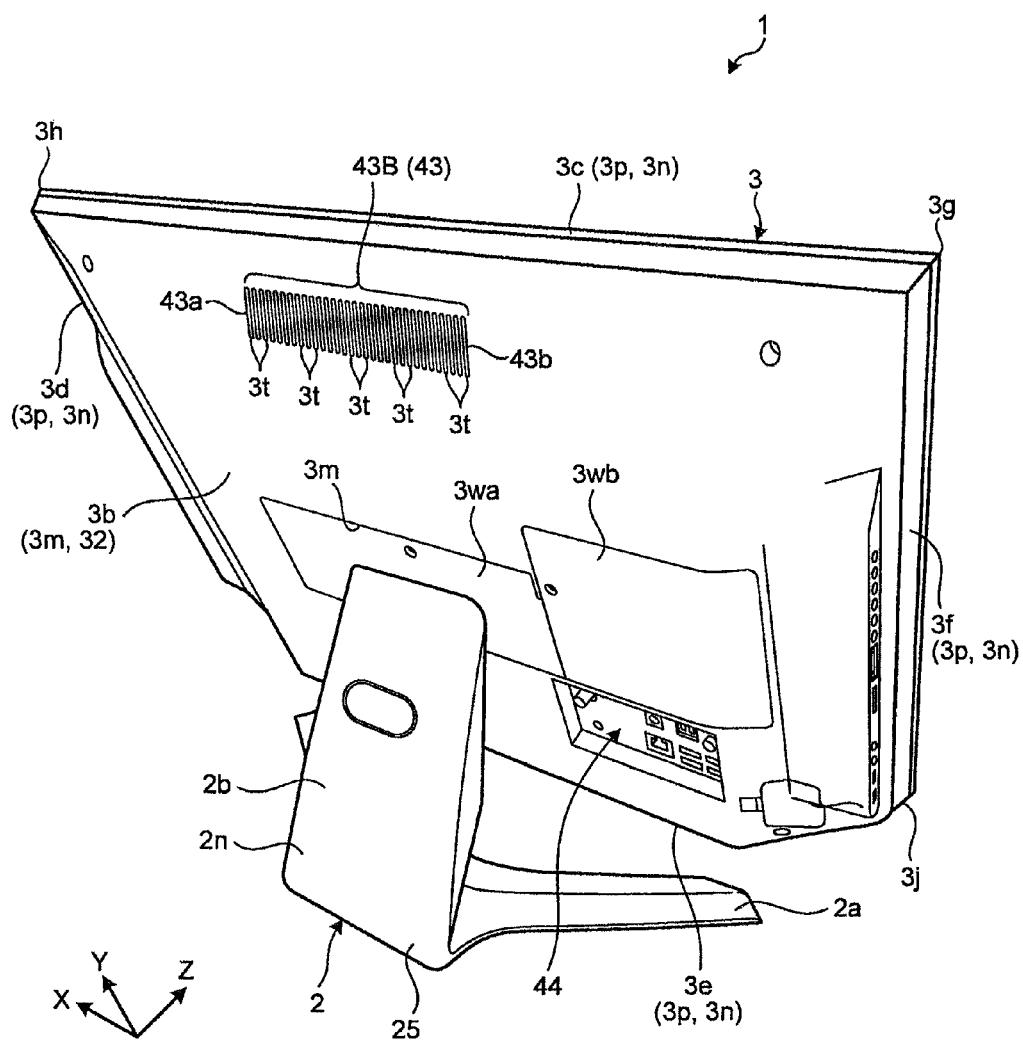
FIG. 2 is an exemplary perspective view illustrating the example of the television receiver in the embodiment when seen from the rear side.
Figure 3:
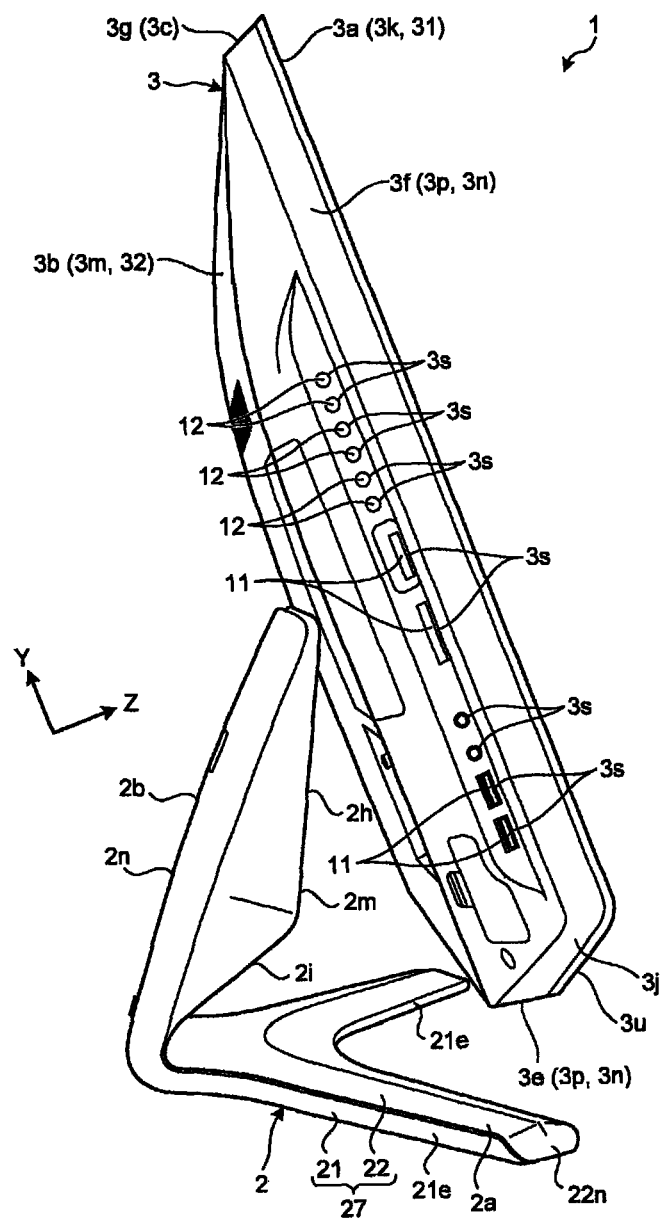
FIG. 3 is an exemplary perspective view illustrating the example of the television receiver in the embodiment when seen from the side surface side.
Figure 4:
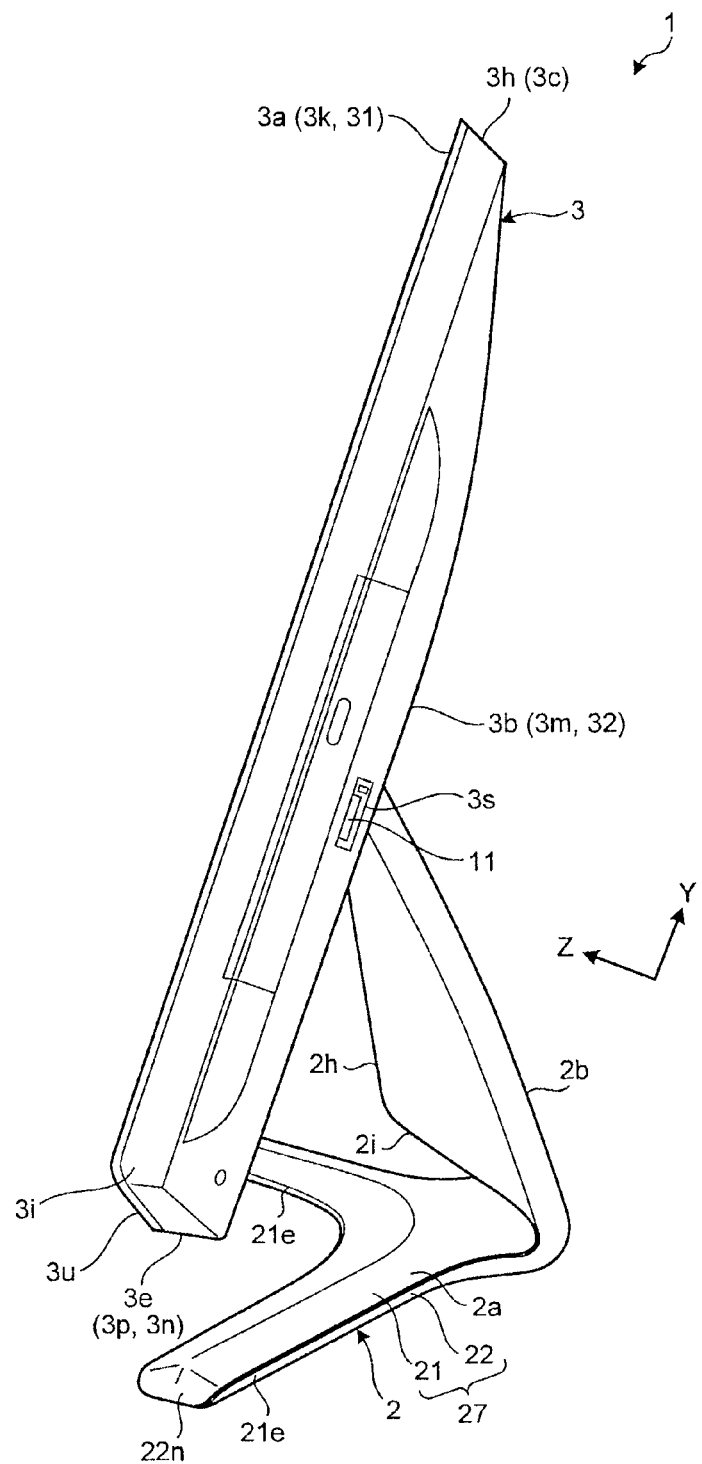
FIG. 4 is an exemplary perspective view illustrating the example of the television receiver in the embodiment when seen from the side surface side at a different angle from that in FIG. 3.

In the embodiment, the housing 3 of the television receiver 1 is configured to have a rectangular shape (in the embodiment, an oblong figure as an example) when seen from the front side and the rear side, as illustrated in FIGS. 1 to 4, as an example. Furthermore, in the embodiment, the housing 3 is configured to have a flattened box shape that is thin in the front-rear direction as illustrated in FIGS. 3 and 4, as an example. The housing 3 comprises a front surface 3a (a front face, a surface, a first surface, a first surface portion) and a back surface 3b (a rear face, a surface, a second surface, a second surface portion) at a side opposite to the front surface 3a. The front surface 3a and the back surface 3b are substantially parallel with each other. The housing 3 comprises four ends 3c to 3f (sides, edges) and four corners 3g to 3j (sharp portions, bent portions, ends) when seen from the front side, as illustrated in FIGS. 1 and 2. The ends 3c and 3e are examples of long sides. Ends 3d and 3f are examples of short sides.

The housing 3 comprises a wall 3k (a first portion, a plate, a frame, a front wall, a surface wall, a ceiling wall) having the front surface 3a and a wall 3m (a second portion, a plate, a back wall, a rear wall, a bottom wall) having the back surface 3b. The walls 3k and 3m have rectangular shapes (in the embodiment, oblong figures as an example). Furthermore, the housing 3 comprises four walls 3n (third portions, plates, side walls, end walls, erected walls, extending portions). The walls 3n have side surfaces 3p (surfaces, circumferential surfaces, third surfaces) connecting between the wall 3k and the wall 3m. It is to be noted that an opening 3r having a rectangular shape is provided on the wall 3k, as an example. Therefore, the wall 3k has a rectangular shape and a frame shape. Note that the wall 3m is an example of a first wall.

Figure 8:
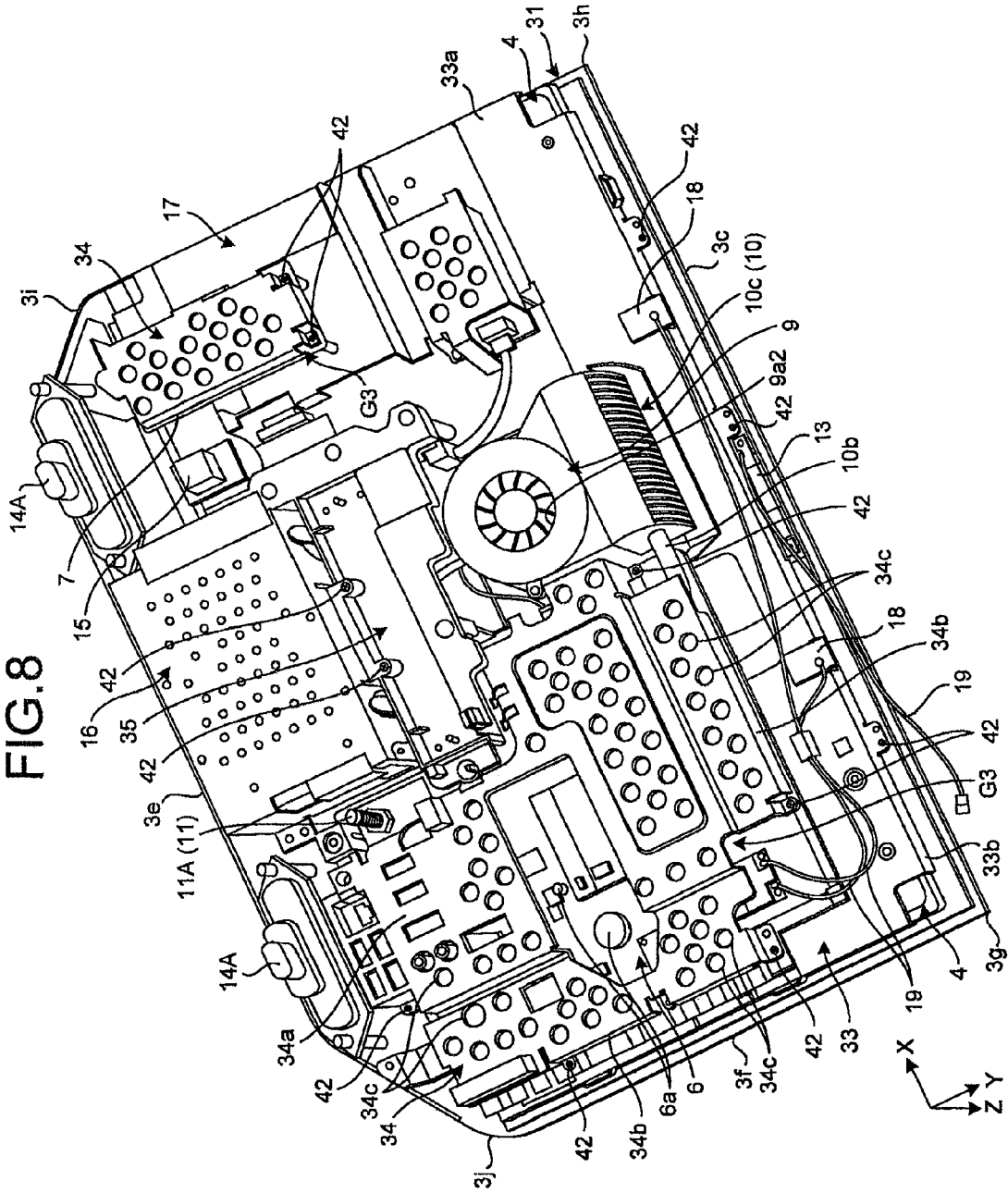
FIG. 8 is an exemplary perspective view illustrating an example of a configuration of the inside of the television receiver in the embodiment.
Figure 9:
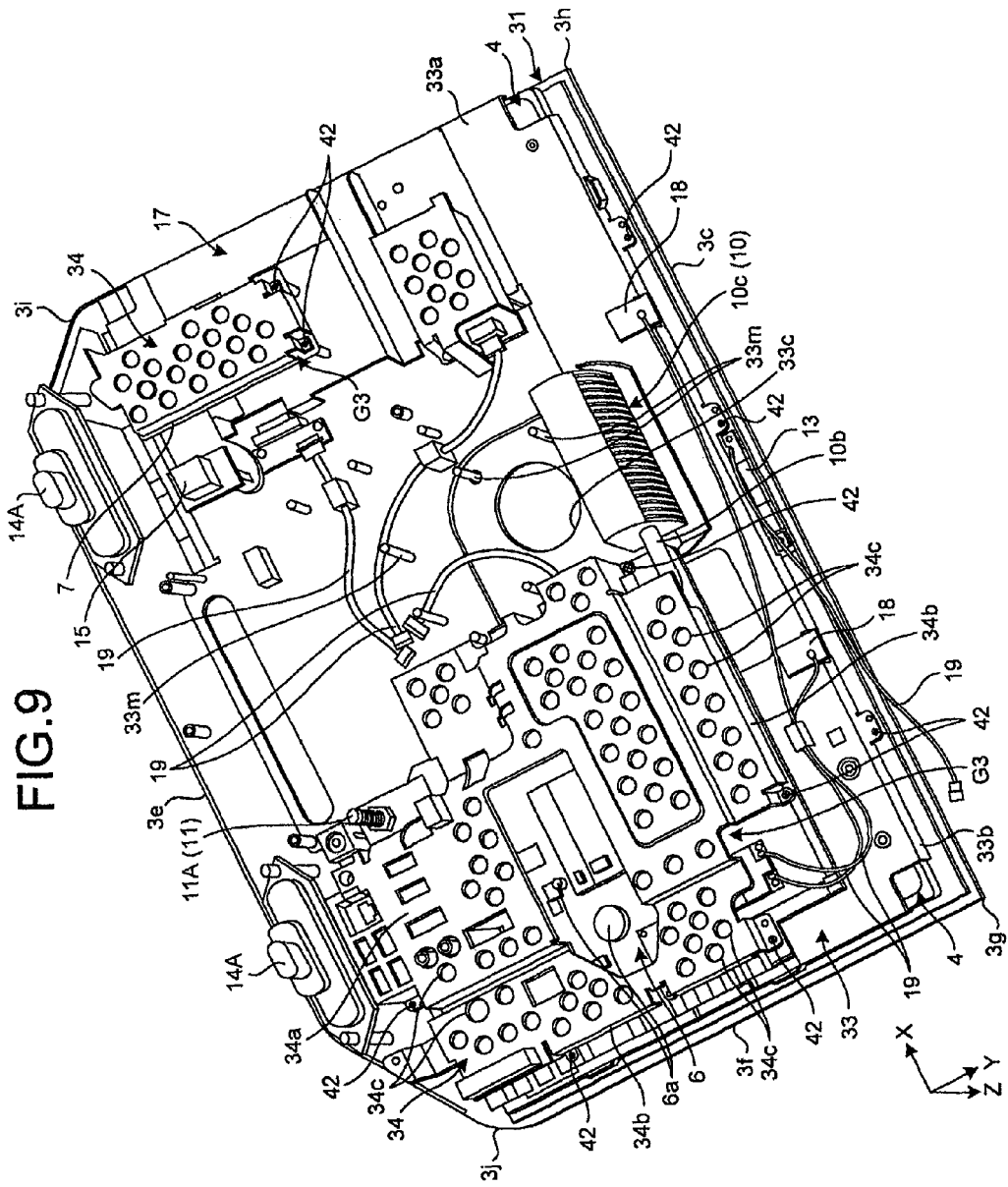
FIG. 9 is an exemplary perspective view illustrating an example of a state where a fan, a fifth housing member, and a module are removed from FIG. 8.

Furthermore, the housing 3 can be configured by combining a plurality of parts (divided members). In the embodiment, the housing 3 comprises a first housing member 31 (a first portion, a front-side member, a mask, a mask section, a cover, a front cover, a cover section, a first region), and a second housing member 32 (a second portion, a back-side member, a base, a base portion, a bottom, a bottom portion, a cover, a rear cover, a cover section, a second region), as an example. The first housing member 31 comprises at least the wall 3k. The second housing member 32 comprises at least the wall 3m. The walls 3n are comprised in at least either of the first housing member 31 or the second housing member 32 (for example, the second housing member 32). Furthermore, in the embodiment, as illustrated in FIGS. 8 and 9, the housing 3 comprises a third housing member 33 (a third portion, an intermediate member, a separation member, a barrier wall member, a wall member, a interposing member, a inner plate, a middle plate, a middle frame), a fourth housing members 34 (a fourth portion, an intermediate member, a separation member, a barrier wall member, a wall member, an interposing member, a cover member, a shield), and a fifth housing member 35 (a fifth portion, a rigid member, a reinforcing member, a bracket, a metal member, a cast member, a metal molding member, a die cast part) in addition to the first housing member 31 and the second housing member 32. The third housing member 33, the fourth housing members 34, and the fifth housing member 35 are located between the first housing member 31 and the second housing member 32. The first housing member 31 is an example of a mask section and the second housing member 32 is an example of a second member and a cover section. Furthermore, the third housing member 33 is located between the display device 4 and the fifth housing member 35 and is an example of a third member that covers a rear surface 4b of the display device 4. The fifth housing member 35 is an example of a first member.

The housing 3 can be formed by a metal material, a synthetic resin material, or the like. As an example, the third housing member 33 and the fourth housing members 34 can be formed by a material having relatively high rigidity (for example, a metal material such as stainless steel, magnesium alloy, and aluminum alloy). The fifth housing member 35 can be formed by a material having relatively high rigidity (for example, a metal material such as aluminum alloy). The fifth housing member 35 can be formed by die casting, as an example. On the other hand, the first housing member 31 and the second housing member 32 can be formed by a material having relatively low rigidity (material having rigidity lower than those of the third housing member 33, the fourth housing members 34, and the fifth housing member 35, for example, a synthetic resin material). It is to be noted that walls (protrusions, protruding walls, not illustrated) such as ribs can be provided on the first housing member 31 and the second housing member 32 at an inner side of the housing 3. With the walls, rigidity of the housing 3 is easy to be made higher.

Figure 6:
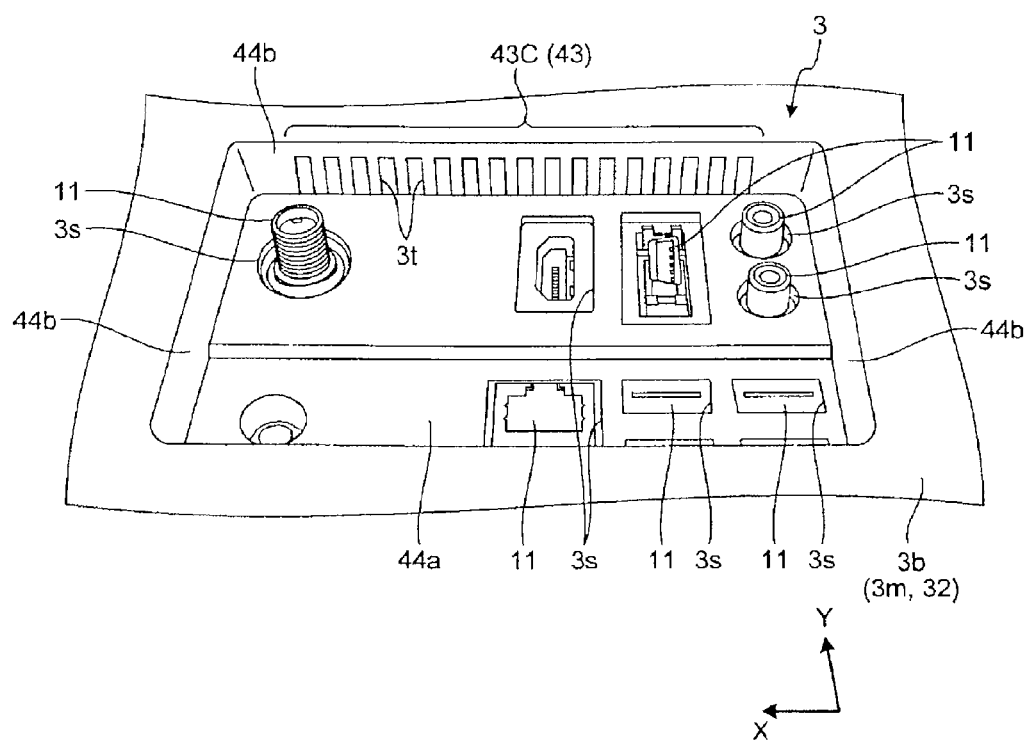
FIG. 6 is an exemplary perspective view illustrating a part of a rear surface of the housing of the example of the television receiver in the embodiment when seen from the lower side.

Furthermore, in the embodiment, connectors 11, operation modules 12, and the like are provided on the back surface 3b and the side surfaces 3p of the housing 3 as illustrated in FIGS. 2, 3, and 4, as an example. The connectors 11 can be connectors for power supply cables, USB connectors, card connectors, connectors for an earphone and a microphone, and the like, for example. The operation modules 12 can be press buttons, press switches, slide switches, pointing devices, dials, and the like, for example. In addition, as illustrated in FIG. 1, a camera module 13 (image capturing device) can be provided on the front surface 3a. The connectors 11, the operation modules 12, and the camera module 13 (camera 13c) are exposed through openings 3s that are provided on the walls 3k, 3m, and 3n of the housing 3. It is to be noted that in the embodiment, the connectors 11 on the back surface 3b are provided in a recess 44 provided on the wall 3b as illustrated in FIG. 6, as an example. The recess 44 is formed to have a rectangular shape (in the embodiment, an oblong figure as an example) in a rear view when seen from the rear side (back side). The recess 44 is constituted by a bottom wall 44a and side walls 44b. The side walls 44b connect between the bottom wall 44a and the wall 3b. As an example, if the recess 44 is provided in this manner, protruding amounts of connectors (not illustrated) connected to the connectors 11 from the housing 3 are decreased. Therefore, the connectors are easy to be suppressed from being detached, as an example.

Figure 5:
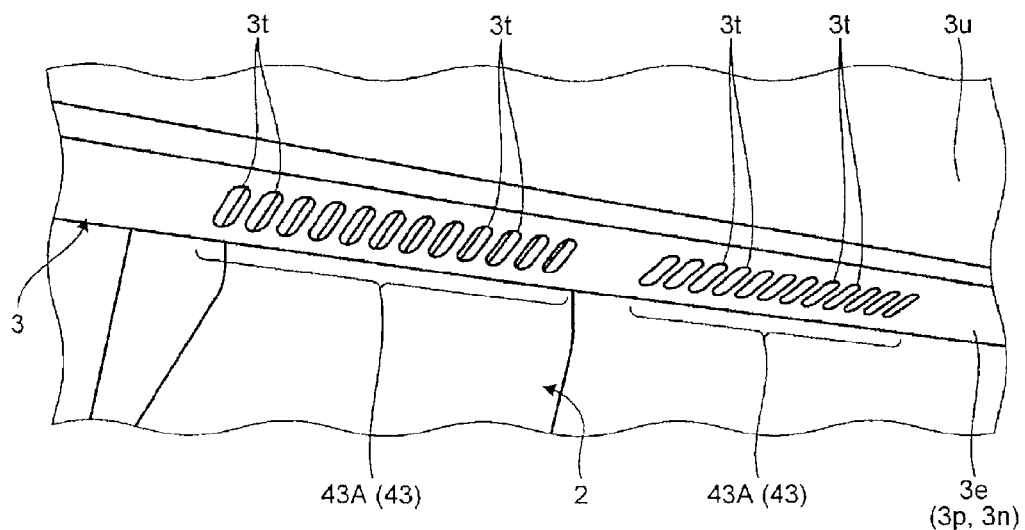
FIG. 5 is an exemplary perspective view illustrating a part of a lower portion of a housing of the example of the television receiver in the embodiment when seen from the lower side.
Figure 7:
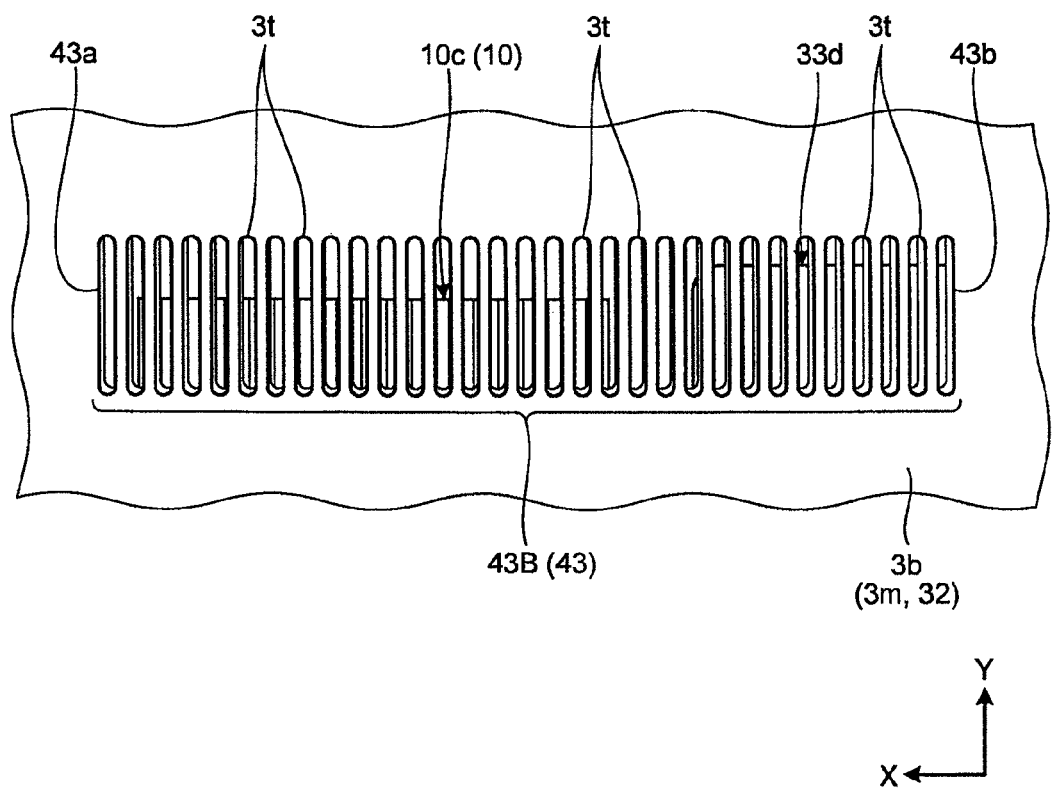
FIG. 7 is an exemplary rear view illustrating a portion on which an air exhaust port is provided on the rear surface of the housing of the example of the television receiver in the embodiment.

Furthermore, in the embodiment, vent ports 43 (openings) are provided on the back surface 3b and the side surface 3p of the housing 3 as illustrated in FIGS. 5 to 7, as an example. The vent ports 43 (openings) introduce and discharge the air used for suppressing temperatures (cooling) of the display device 4, parts 6a (electric parts, electronic parts, elements, modules, chips, and the like, see FIGS. 8 and 9) provided on substrates 6 and 7 (a circuit substrate, a printed substrate, a printed circuit substrate), and the like, in the housing 3 from being increased. In the embodiment, as an example, vent ports 43A (43) that function as introduction ports for introducing the air are provided on the side surface 3p (a wall 3n, an end 3d). A vent port 43B (43) that functions as a discharge port for discharging the air is provided on the back surface 3b (a wall 3m). In the embodiment, the vent ports 43 are provided as portions on which a plurality of small holes 3t (slits) provided on the walls 3m and 3n are collected, as an example. It is to be noted that the inside of the housing 3 may be cooled by forced cooling using a fan 9 or a cooling device 10 (see FIG. 8) or may be cooled by natural cooling (convection cooling). Meanwhile, the vent ports 43 can be provided on the front surface 3a.

To be more specific, in the embodiment, the vent ports 43A that function as introduction ports (air inlet ports, entrances) are provided on the wall 3n on the lower end 3e of the housing 3 as illustrated in FIG. 5, as an example. Furthermore, in the embodiment, the vent port 43B that functions as a discharge port (an air exhaust port, an exit) is provided on the wall 3b on the upper end 3c of the housing 3 as illustrated in FIGS. 2 and 7, as an example. The end 3c connects between two corners 3g and 3h located at the upper side. With this configuration, airflow toward the upper side from the lower side is easy to be formed in the housing 3. Natural convection with heat travels toward the upper side from the lower side. Therefore, if the vent ports 43 (openings) are provided on the ends 3e and 3c at the upper portion and the lower portion of the housing 3, air ventilation is easy to be realized more smoothly. Moreover, in the embodiment, a vent port 43C that functions as an introduction port is provided on the side wall 44b of the recess 44 as illustrated in FIG. 6, as an example. The vent port 43 is provided on the side wall 44b of the recess 44 in this manner so that the vent port 43 is difficult to be noticeable, as an example. Furthermore, as an example, the vent ports 43 are provided on the wall 3n facing a floor and the side wall 44b so that not only the vent ports 43 are difficult to be noticeable but also dusts and the like can be made difficult to enter the housing 3 through the vent ports 43, as a result. In addition, the vent ports 43 are provided on the wall 3n and the side wall 44b along the thickness direction of the housing 3 so that airflows in the directions along the walls 3m and 3k are easier to be formed in the housing 3 with the air introduced through the vent ports 43 in comparison with a case where the vent ports 43 are provided on the walls 3m and 3k along the direction perpendicular to the thickness direction of the housing 3, as an example.

Figure 10:
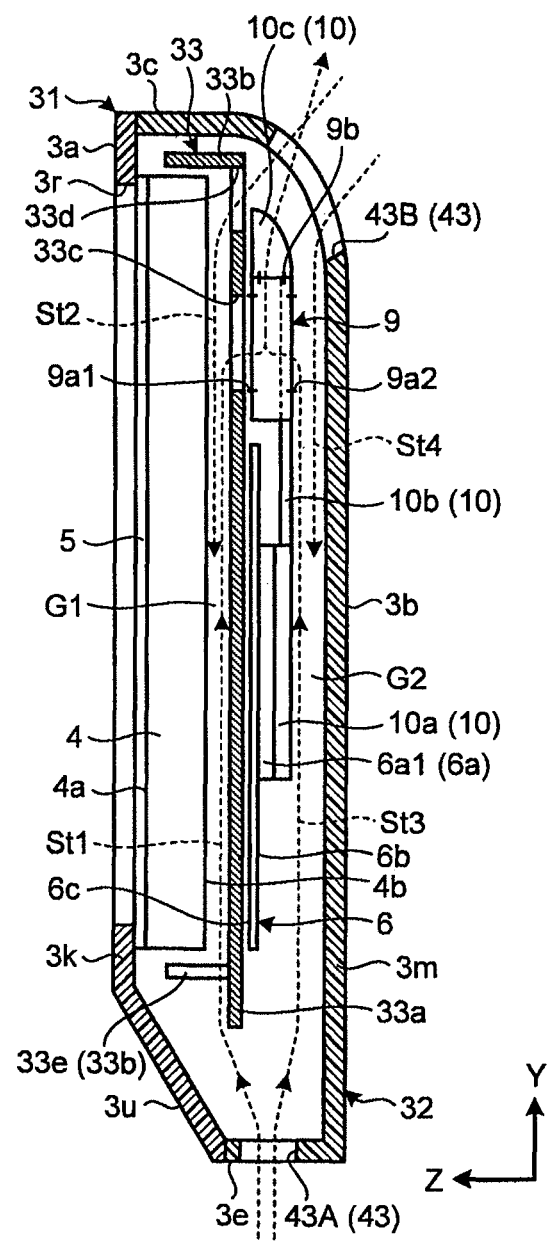
FIG. 10 is an exemplary plan view schematically illustrating a cross section cut along a line X-X in FIG. 1 in the embodiment.

In the embodiment, the display device 4 (a display module, a display, a panel) is accommodated between the first housing member 31 and the third housing member 33 as illustrated in FIGS. 8 to 10, as an example. As illustrated in FIG. 1, the display screen 4a of the display device 4 that is located at the front surface 3a side is exposed to a front side (an outer side) of the housing 3 through the opening 3r. Therefore, a user can visually recognize the display screen 4a through the opening 3r from the front side. The display device 4 is configured to have a rectangular shape (in the embodiment, an oblong figure as an example) when seen from the front side. Furthermore, the display device 4 is configured to have a flattened box shape that is thin in the front-rear direction. For example, the display device 4 is a liquid crystal display (LCD), an organic electro-luminescent display (GELD), or the like, for example.

Furthermore, in the embodiment, an input operation panel 5 (a touch panel, a touch sensor, an operation surface as an example) is provided at the front side (surface side, wall 3k side) of the display device 4 as illustrated in FIG. 10, as an example. The input operation panel 5 is configured to be transparent and have a relatively thin rectangular shape and covers the display screen 4a. An operator (user or the like) performs an operation on the input operation panel 5 with a hand, a finger, or a part (for example, a stylus, not illustrated), for example, so as to execute an input processing. The operation performed by the operator includes touching, pressing, sliding, or moving his (her) hand or finger or stylus in the vicinity of the input operation panel 5. In addition, light emitted from the display screen 4a of the display device 4 passes through the input operation panel 5 so as to travel to the front side (the outer side) of the housing 3 from the opening 3r of the wall 3k. The input operation panel 5 is an example of an input module.

Furthermore, in the embodiment, the substrates 6 and 7 are accommodated in the housing 3 at the back side (rear side, behind, wall 3m side, side opposite to the display screen 4a) of the display device 4 as illustrated in FIG. 10, as an example. To be more specific, in the embodiment, the substrates 6 and 7 are accommodated between the wall 3m of the second housing member 32 and a wall 33a of the third housing member 33, as an example. The substrates 6 and 7 are arranged at positions that are different from each other and both of them are provided in parallel with the display device 4. In addition, the substrates 6 and 7 are provided in a state where they are separated from the walls 3k, 3m, 3n, and the like, that is to say, in a state where a space (a gap) is formed between each of the substrates 6 and 7 and each of the walls 3k, 3m, 3n, and the like. The substrates 6 and 7 are arranged to be aligned along the display device 4 so as not to overlap with each other in the thickness direction of the housing 3 preferably. In addition, the substrates 6 and 7 are fixed to the housing 3 with fixtures 42 such as screws.

Furthermore, in the embodiment, the parts 6a (see FIGS. 8 and 9, only a part of them are illustrated in FIGS. 8 and 9) such as a central processing unit (CPU), a graphic controller, a power supply circuit part, a platform controller hub (PCH), a memory slot connector, an LCD connector, an input/output (I/O) connector, a power supply coil, an element, and a connector can be mounted on the substrate 6 (a first substrate, a first circuit substrate, a control substrate, a main substrate), as an example. The parts 6a include a heat generator. The cooling device 10 can be provided for the part 6a (heat generator) of which heat generation amount is large. The cooling device 10 comprises a heat sink (a heat receiver, not illustrated), a heat transfer module 10b (for example, a heat pipe), a heat dissipation module 10c, the fan 9, and the like. The heat dissipation module 10c is thermally connected to the heat generator through the heat receiver and the heat transfer module 10b. At least a part of a control circuit (not illustrated) is constituted by the substrate 6 and the parts 6a. Furthermore, the control circuit can comprise a video signal processing circuit, a first tuner module, a high-definition multimedia interface (HDMI) signal processor, an audio video (AV) input terminal, a remote controller signal receiver, a controller, a selector, an on-screen display interface, a storage module (for example, a read only memory (ROM), a random access memory (RAM), a hard disk drive (HDD), a solid state drive (SSD)), a voice signal processing circuit, and the like. The control circuit controls output of a video image (a moving image, a still image, or the like) on the display screen 4a of the display device 4, output of sound with a speaker (not illustrated), light emission from a light emitting diode (LED) (not illustrated), and the like. The display device 4, the speaker, the LED, and the like are examples of an output module.

Furthermore, in the embodiment, circuits required for operating as the television receiver 1, for example, a second tuner module, an HDMI signal processor, a selector, an on-screen display interface, and the like are provided on the substrate 7 (a second substrate, a second circuit substrate, a sub substrate, a tuner substrate), as an example. In the embodiment, as an example, since the tuner module is provided on each of the substrates 6 and 7, the substrates 6 and 7 and circuits that operate can be switched between a case where the television receiver 1 operates as a personal computer and a television receiver and a case where the television receiver 1 does not operate as a personal computer but operates as a television receiver. Therefore, power consumption of the television receiver 1 is easy to be reduced, as an example. It is to be noted that the connector 11 on which a card (an ID card, an IC card) for effectively operating a tuner is mounted is provided on each of the substrates 6 and 7. The connectors 11 are exposed on the ends 3d and 3f at both of left and right sides of the housing 3. With this, as an example, a user can easily recognize whether a card is mounted on each of the connectors 11.

Furthermore, in the embodiment, the first housing member 31 is configured to have a rectangular shape (in the embodiment, an oblong figure as an example) and a frame shape when seen from the front side and the rear side as illustrated in FIG. 1, as an example. The opening 3r is provided at a center of the first housing member 31. The wall 3k and the front surface 3a as peripheral edges of the opening 3r are formed in band-like and plate-like shape. Furthermore, the first housing member 31 covers edges (peripheral edges) of the display device 4 and the input operation panel 5 from the front side. Accordingly, the first housing member 31 is an example of a bezel (a front bezel). Furthermore, the first housing member 31 is an example of an outer frame (shell).

Furthermore, in the embodiment, a speaker 14A (for example, a speaker system, a full range, a tweeter) is attached to the lower end 3e of the first housing member 31 as illustrated in FIGS. 8 and 9, as an example. In the embodiment, an inclined surface 3u that is inclined to the rear side toward the lower side is provided on the end 3e of the first housing member 31 on which the speaker 14A is provided as illustrated in FIGS. 1, 3, and 4, as an example. The inclined surface 3u is difficult to be seen on a line of sight from an obliquely upward side, as an example. Therefore, the front surface 3a can be suppressed from being seen as largely flared to the lower side even with a configuration in which a portion on which the speaker 14A is provided is flared to the lower side with respect to a portion on which the opening 3r is provided as in the embodiment in comparison with a case where the inclined surface 3u is not provided, as an example.

Furthermore, in the embodiment, the second housing member 32 is configured to have a rectangular shape (in the embodiment, an oblong figure as an example) when seen from the front side and the rear side as illustrated in FIG. 2, as an example. The second housing member 32 is configured to be in a plate form entirely. To be more specific, the second housing member 32 comprises the wall 3m and the walls 3n. The walls 3n are erected from the wall 3m on the peripheral edges of the wall 3m. The (wall 3m of the) second housing member 32 covers the display device 4, the substrates 6 and 7, the third housing member 33, the fourth housing members 34, and the fifth housing member 35 from the back side. Therefore, the second housing member 32 is an example of an outer frame (shell). Furthermore, the wall 3m is an example of a first wall.

Figure 11:
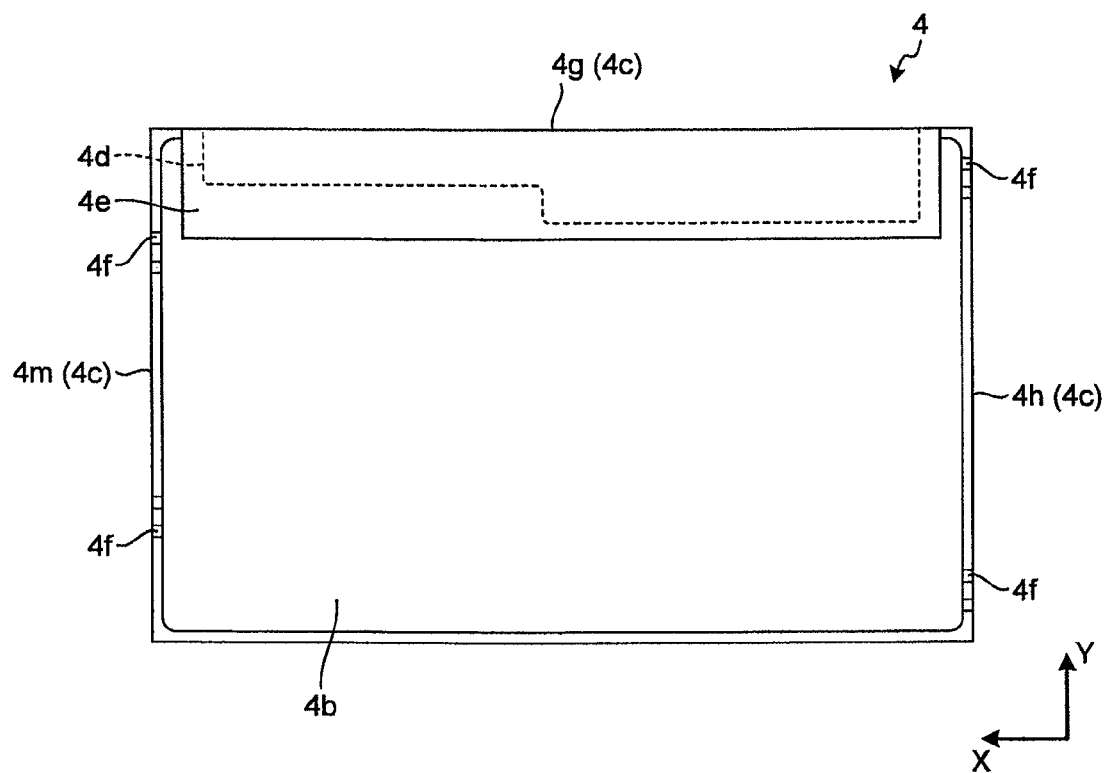
FIG. 11 is an exemplary rear view illustrating an example of a display device of the television receiver in the embodiment.

Furthermore, in the embodiment, the display device 4 is configured to have a rectangular shape (in the embodiment, an oblong figure as an example) when seen from the front side and the rear side, as an example. Moreover, in the embodiment, the display device 4 is configured to have a flattened box shape that is thin in the front-rear direction. Furthermore, in the embodiment, an opening (a hole, a notch, or the like) is not provided on the rear surface 4b (back surface) of the display device 4 and the rear surface 4b is entirely covered by a plate (a wall, a metal plate) and is formed as a flattened surface as illustrated in FIG. 11, as an example. It is to be noted that in the embodiment, a substrate 4d (a circuit substrate) on which a circuit for operating the display device 4 is formed is provided on the rear surface 4b along an end 4g (in the embodiment, an upper end as an example) of the display device 4, as an example. The substrate 4d is covered by a cover portion 4e (a cover, a film, an insulator).

Figure 12:
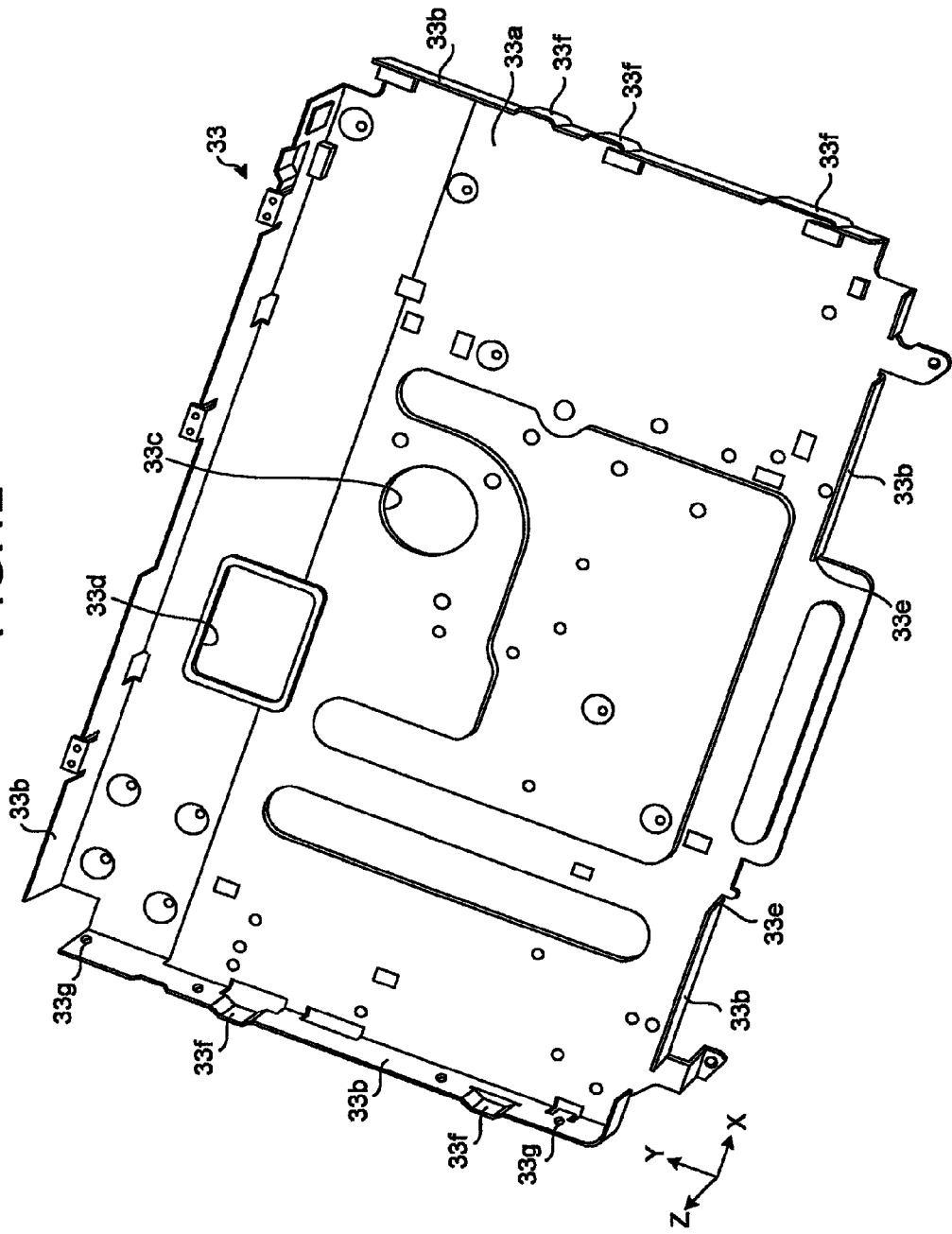
FIG. 12 is an exemplary perspective view illustrating an example of a third housing member of the television receiver in the embodiment.

In the embodiment, the rear surface 4b of the display device 4 is covered by the wall 33a of the third housing member 33 as illustrated in FIGS. 8 to 10, as an example. To be more specific, as illustrated in FIGS. 8, 9, and 12, the third housing member 33 is configured to be in a plate form entirely. The third housing member 33 comprises the wall 33a and walls 33b. The wall 33a has a rectangular shape and a plate-like shape and covers the rear surface 4b of the display device 4. As illustrated in FIG. 10, a gap G1 is formed between the wall 33a and the rear surface 4b. That is to say, the wall 33a is provided at the back side (rear side, behind) of the rear surface 4b with a space. The wall 33a is an example of a second wall (a separation wall, a plate, a lateral wall, a base). Furthermore, the walls 33b are erected from the wall 33a on peripheral edges of the wall 33a. The walls 33b are examples of a third wall (side wall, longitudinal wall, erected wall, peripheral wall). Openings 33c and 33d are provided on the wall 33a. The openings 33c and 33d make a space at the front side (display device 4 side) of the wall 33a and a space at the rear side (opposite side to the display device 4) thereof communicate with each other. It is to be noted that in the embodiment, sharp edges are suppressed from being generated on edges of the opening 33d by folding the edges thereof, as an example. Therefore, harnesses 19 and the like are suppressed from being damaged, as an example. Furthermore, as illustrated in FIG. 9, protrusions 33m used for joining with another member and part and positioning are provided on the wall 33a.

Figure 13:
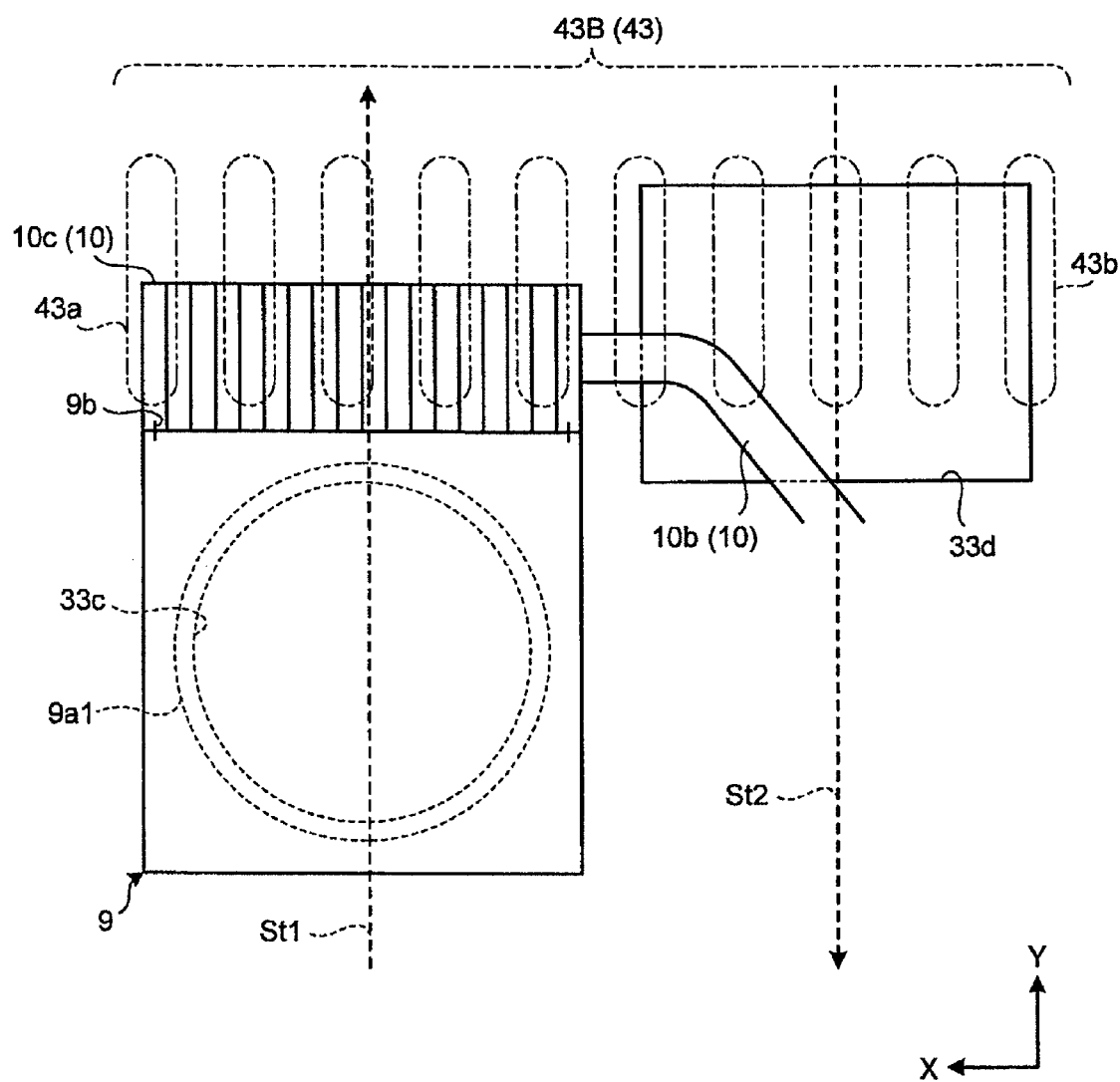
FIG. 13 is an exemplary plan view schematically illustrating a part of an inner configuration of the television receiver in the embodiment.

Furthermore, in the embodiment, airflow St is made to flow in the gap G1 between the wall 33a and the rear surface 4b of the display device 4 as illustrated in FIG. 10, as an example. To be more specific, as is obvious from FIGS. 8 and 9, the fan 9 is arranged so as to cover the opening 33c provided on the wall 33a of the third housing member 33. As illustrated in FIGS. 10 and 13, an air inlet port 9a1 of the fan 9 overlaps with the opening 33c. Therefore, in the embodiment, an airflow St1 is formed as illustrated in FIGS. 10 and 13, as an example. The airflow St1 flows into the housing 3 through the vent ports 43A and passes through the gap G1 and the opening 33c so as to flow into the fan 9 from the air inlet port 9a1 thereof. The vent port 43B faces an air exhaust port 9b of the fan 9. The heat dissipation module 10c is located between the air exhaust port 9b and the vent port 43B. Therefore, the airflow St1 passes through the heat dissipation module 10c (for example, gaps of fins) from the air exhaust port 9b of the fan 9 so as to flow to the outside of the housing 3 through the vent port 43B. A temperature of the (rear surface 4b of the) display device 4 is easy to be suppressed from being increased with the airflow St1, as an example. Moreover, a temperature of the wall 33a of the third housing member 33 is easy to be suppressed from being increased with the airflow St1, as an example. Accordingly, temperatures of the substrate 6 and the heat generator such as the part 6a (see FIGS. 8 and 9) mounted on the substrate 6 are easy to be suppressed from being increased.

Furthermore, in the embodiment, the air exhaust port 9b of the fan 9 is located so as to be closer to one end 43a side (in the embodiment, one end in the longitudinal direction as an example, left end in FIG. 13) of the vent port 43B extending along the end 3c of the housing 3 as illustrated in FIG. 13, as an example. That is to say, the air exhaust port 9b of the fan 9 faces a part (in the embodiment, a region at the left side in FIG. 13, as an example) of the vent port 43B. Therefore, one region (in the embodiment, the region at the left side in FIG. 13, as an example) of the vent port 43B facing the air exhaust port 9b mainly functions as a discharge port (an air exhaust port). With this, the other region (in the embodiment, a region at the right side in FIG. 13, as an example) of the vent port 43B mainly functions as an introduction port (an air inlet port). A pressure in the housing 3 is lowered with discharge of the air (the airflow St1) from the one region of the vent port 43B. Therefore, the air (an airflow St2) is introduced from the other region of the vent port 43B.

Furthermore, in the embodiment, the opening 33d is located so as to be closer to the other end 43b side (in the embodiment, the other end in the longitudinal direction as an example, right end) of the vent port 43B as illustrated in FIG. 13, as an example. The opening 33d faces a region at the other end 43b side of the vent port 43B. Therefore, in the embodiment, the airflow St2 as illustrated in FIGS. 10 and 13 is formed as an example. The airflow St2 flows into the housing 3 through the other region of the vent port 43B and passes through the opening 33d so as to flow in the gap G1. A temperature of the airflow St2 is lower than that of the inside of the housing 3 in which a heat generator 6a1 is accommodated. Therefore, air ventilation in the housing 3 such as the gap G1 is accelerated so that the temperature of the (rear surface 4b of the) display device 4 is easy to be suppressed from being increased, as an example. Moreover, the temperature of the wall 33a of the third housing member 33 is easy to be suppressed from being increased with the airflow St2, as an example. Accordingly, temperatures of the substrate 6 and the heat generator 6a1 such as the part 6a (see FIGS. 8 and 9) mounted on the substrate 6 are easy to be suppressed from being increased. The opening 33d is an example of a third opening.

Furthermore, in the embodiment, in the housing 3, airflows St3, St4 are formed on a gap G2 between the wall 33a of the third housing member 33 and the wall 3m of the second housing member 32 with an operation of the fan 9 as illustrated in FIG. 10, as an example. The airflow St3 flows into the housing 3 through the vent ports 43A and flows into an air inlet port 9a2 of the fan 9 through the gap G2. The air inlet port 9a2 is provided at the side (rear side) opposite to the air inlet port 9a1. The airflow St3 passes through the heat dissipation module 10c (for example, gaps of fins) from the air exhaust port 9b of the fan 9 so as to flow to the outside of the housing 3 through the vent port 43B. On the other hand, the airflow St4 flows into the housing 3 through the other region of the vent port 43B so as to flow in the gap G2. The temperatures of the heat generators such as the parts 6a and 7a located in the gap G2 are suppressed from being increased with the airflows St3, St4 flowing in the gap G2. Furthermore, in the embodiment, the heat transfer module 10b communicating with the heat dissipation module 10c faces the other region of the vent port 43B as illustrated in FIG. 13, as an example. Therefore, the airflow St4 and the airflow St2 hit the heat transfer module 10b so that the temperature of the heat transfer module 10b is much easier to be suppressed from being increased. Therefore, a cooling efficiency by the cooling device 10 is easy to be higher.

In addition, in the embodiment, openings 33e are provided on the third housing member 33 at the side (in the embodiment, lower side, as an example) opposite to the vent port 43B with respect to the opening 33c as illustrated in FIGS. 10 and 12, as an example. The airflow St1 becomes easier to flow with the openings 33e, as an example. Furthermore, in the embodiment, the openings 33e can be configured as through holes or notches, for example, as illustrated in FIG. 12, as an example. In the embodiment, the openings 33e are configured as regions on which the wall 33b is not partially provided, that is, as notches of the wall 33b, as an example. With this configuration, the openings 33e can be configured simpler, as an example. The openings 33e are examples of a fifth opening.

Furthermore, in the embodiment, the substrates 6 and 7 are covered by the fourth housing members 34 as illustrated in FIGS. 8 and 9, as an example. To be more specific, as illustrated in FIGS. 8 and 9, the fourth housing members 34 are configured to be in a plate form entirely. Each fourth housing member 34 comprises a wall 34a and walls 34b. The walls 34a are configured to have rectangular shapes and plate-like shapes and cover the rear side (back side, side opposite to the display device 4) of the substrates 6 and 7. Gaps G3 are formed between the walls 34a and the substrates 6 and 7. That is to say, the walls 34a are provided at the rear side (back side, behind) of the substrates 6 and 7 with spaces. In addition, the walls 34b are erected from the walls 34a on the peripheral edges of the walls 34a. The walls 34b are examples of a side wall (a longitudinal wall, an erected wall, a peripheral wall). Openings 34c are provided on the walls 34a. The fourth housing members 34 can be configured to be light weight and ventilation in the housing 3 is easy to be enhanced with the openings 34c, as an example. When the fourth housing members 34 are formed by a conductive material such as a metal, the fourth housing members 34 can function as electromagnetic shields. The fourth housing members 34 are joined to other housing members (for example, the third housing member 33) through the fixtures 42 such as screws, as an example. Furthermore, in the embodiment, connectors 11A (11) are fixed to the fourth housing members 34 as illustrated in FIGS. 8 and 9, as an example. With this, the connectors 11A (11) can be fixed more firmly in comparison with a case where the connectors 11A (11) are fixed to the substrates 6 and 7, as an example. Moreover, the connectors 11A (11) are easy to be provided at positions that are farther from the substrates 6 and 7, as an example.

Figure 27:
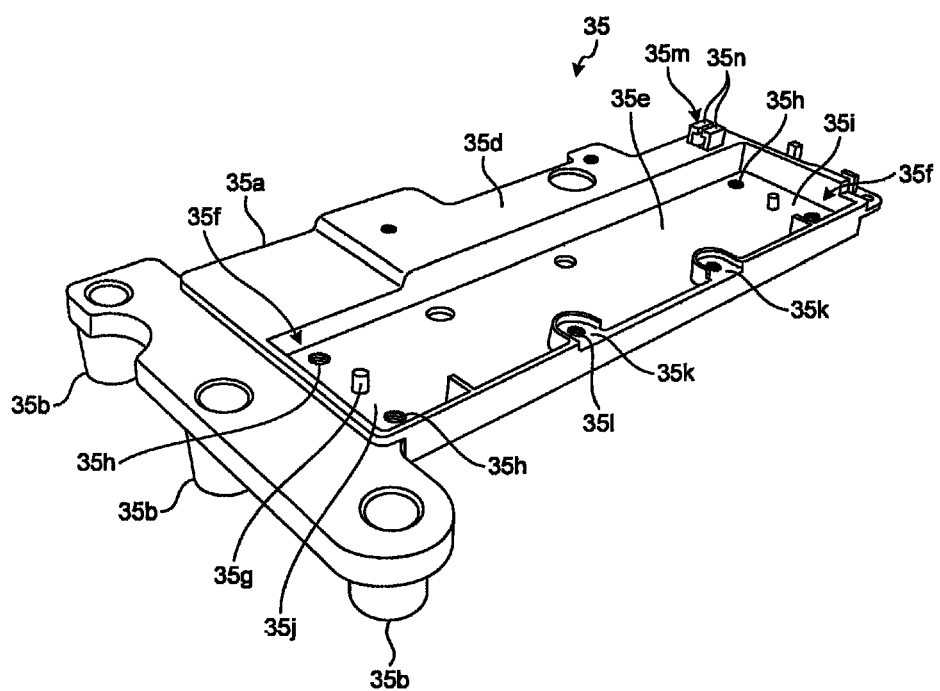
FIG. 27 is an exemplary perspective view illustrating the example of the fifth housing member of the television receiver in the embodiment when seen from the rear side.
Figure 28:
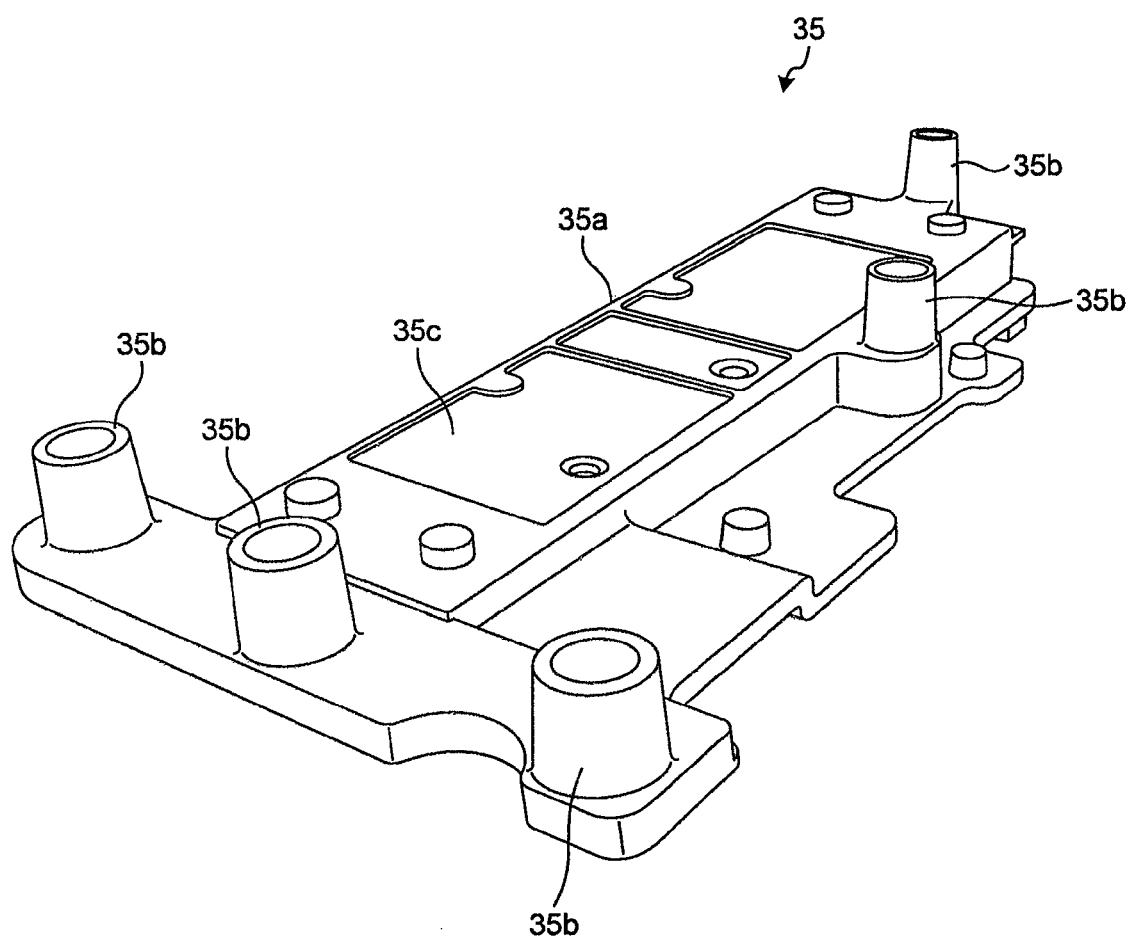
FIG. 28 is an exemplary perspective view illustrating the example of the fifth housing member of the television receiver in the embodiment when seen from the front side.

In the embodiment, the fifth housing member 35 is provided at the rear side (side opposite to the display device 4) of the center of the wall 33a of the third housing member 33 as is obvious from FIGS. 8 and 9, as an example. The fifth housing member 35 is used as a fixing portion to the hinge 8. In addition, in the embodiment, the substrates 6 and 7 are arranged at both sides with respect to the fifth housing member 35, as an example. Therefore, the substrates 6 and 7 can be arranged more efficiently by effectively using spaces around the fifth housing member 35 while stably supporting the housing 3 through the fifth housing member 35, as an example. In addition, the fifth housing member 35 comprises a plate-like base portion 35a and protrusions 35b that protrude from the base portion 35a as illustrated in FIGS. 27 and 28, as an example. The protrusions 35b protrude to the third housing member 33 side from the base portion 35a. Therefore, a gap G4 is formed between the base portion 35a and the wall 33a of the third housing member 33. Accordingly, the fifth housing member 35 is easy to be suppressed from being a barrier wall of airflow toward the fan 9 in the housing 3, as an example. It is to be noted that the protrusions 35b can be configured as fixing parts (internal threads) to which the fixtures for joining the third housing member 33 and the fifth housing member 35 are fixed.

Furthermore, in the embodiment, parts such as a distributor 15 (duplexer), a module 16 (as an example, HDD: hard disk drive), a module 17 (as an example, ODD: optical disk drive), and antennas 18 are accommodated in the housing 3 as illustrated in FIGS. 8 and 9, as an example. These parts are fixed to the first housing member 31, the third housing member 33, the fifth housing member 35, or the like with the fixtures 42 such as screws. Furthermore, the parts and the substrates 6 and 7 are electrically connected to one another through the harnesses 19 (wirings, cables, wires).

Figure 14:
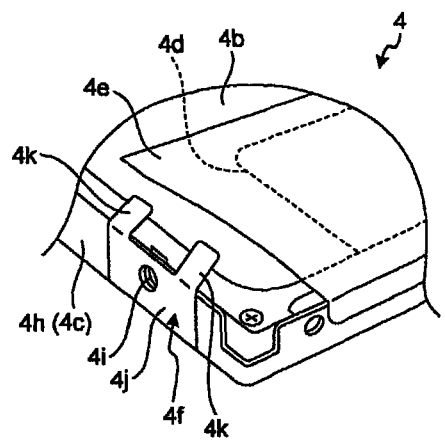
FIG. 14 is an exemplary perspective view illustrating examples of a first housing member and the display device of the television receiver in the embodiment when seen from the rear side.

Furthermore, in the embodiment, a fixing part 4i (for example, internal threaded hole) to which a fixture (not illustrated) such as a screw is fixed is provided on a side surface 4c of one end 4h (in the embodiment, one end in the longitudinal direction as an example, short side portion, see FIG. 11) of the display device 4 as illustrated in FIG. 14, as an example. Furthermore, as illustrated in FIG. 12, openings 33g through which fixtures are inserted are provided on the walls 33b of the third housing member 33. The openings 33g are through holes, or notches, for example. In the embodiment, the openings 33g are through holes, as an example. The fixture is fixed to the fixing part 4i on the side surface 4c through the opening 33g on the wall 33b. With this, the display device 4 and the third housing member 33 are joined to each other. In the embodiment, the size of the gap G1 (see FIG. 10) between the rear surface 4b of the display device 4 and the wall 33a of the third housing member 33 can be set by a position of the opening 33g on the wall 33b and a position of the fixing part 4i on the side surface 4c, as an example. It is to be noted that guide members 4f are attached to the side surfaces 4c. The guide members 4f make (guide) the third housing member 33 and the display device 4 closer to each other more smoothly when they are assembled. The guide members 4f are formed by a relatively flexible material (for example, synthetic resin material) as an example. Each guide member 4f comprises a base portion 4j fixed to the side surface 4c and protrusions 4k that protrude to the rear side in a state of being bent toward the center side of the display device 4 from the base portion 4j.

Figure 17:
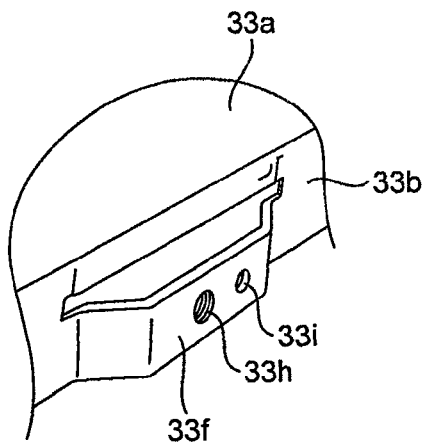
FIG. 17 is an exemplary perspective view illustrating a part of the example of the third housing member of the television receiver in the embodiment.
Figure 18:
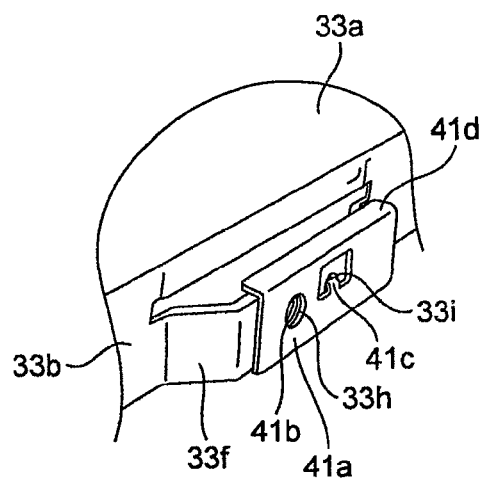
FIG. 18 is an exemplary perspective view illustrating an example of a state where a fastener is attached to the state in FIG. 16 in the embodiment.
Figure 19:
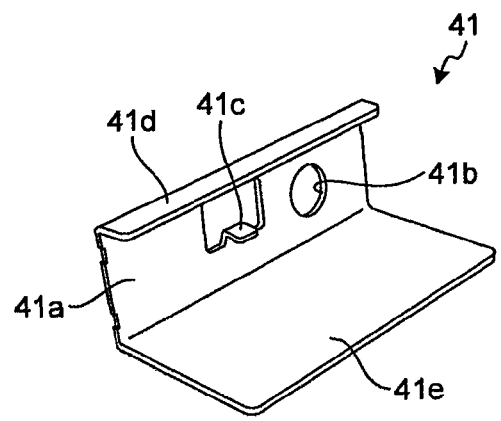
FIG. 19 is an exemplary perspective view illustrating an example of the fastener of the television receiver in the embodiment.

In addition, in the embodiment, the fixing part 4i is not provided on an end 4m (see FIGS. 15 and 16) at the side opposite to the end 4h of the display device 4 on which the fixing part is provided, as an example. Therefore, in the embodiment, the end 4m and the third housing member 33 are joined to each other with a mounting 41 (a clasp, a bracket, an attachment part, an engagement part), as an example. To be more specific, as illustrated in FIG. 17, engagement modules 33f that protrude to the outer side of the housing 3 from the walls 33b are provided on the walls 33b of the third housing member 33. In the embodiment, the engagement modules 33f are formed by partially cutting and erecting the walls 33b, as an example. Fixing parts 33h (for example, internal threaded holes) and positioning parts 33i (for example, openings, in the embodiment, through holes as an example) are provided on the engagement parts 33f. In addition, in the embodiment, the mounting 41 functions as a hook bent in a U-shaped form as illustrated in FIG. 19, as an example. An opening 41b through which the fixture 42 such as a screw is inserted and a positioning part 41c corresponding to the positioning part 33i are provided on a wall 41a corresponding to a U-shaped bottom. The opening 41b is a through hole or a notch, for example. In the embodiment, the opening 41b is a through hole, as an example. Furthermore, the positioning part 41c is a protrusion or a claw, for example, and is formed by cutting and erecting the wall 41a in the embodiment, as an example. A wall 41d protrudes from one (rear) end of the wall 41a and a wall 41e protrudes from the other (front) end of the wall 41a. The mounting 41 engages with the third housing member 33 in a state as illustrated in FIG. 18. That is to say, the protrusion of the mounting 41 as the positioning part 41c is inserted into the opening as the positioning part 41c of the engagement part 33f. The fixture 42 (see FIG. 15) that has been inserted through the opening 41b of the mounting 41 is fixed to the fixing part 33h of the engagement part 33f. The wall 41d covers an edge of the engagement part 33f at the rear side and the wall 41e covers the peripheral edge of the display screen 4a of the display device 4 from the front side. That is to say, the display device 4 and the third housing member 33 can be joined to each other by hooking the peripheral edge of the display screen 4a of the display device 4 with the mounting 41 attached to the third housing member 33 at the end 4m side of the display device 4.

Figure 15:
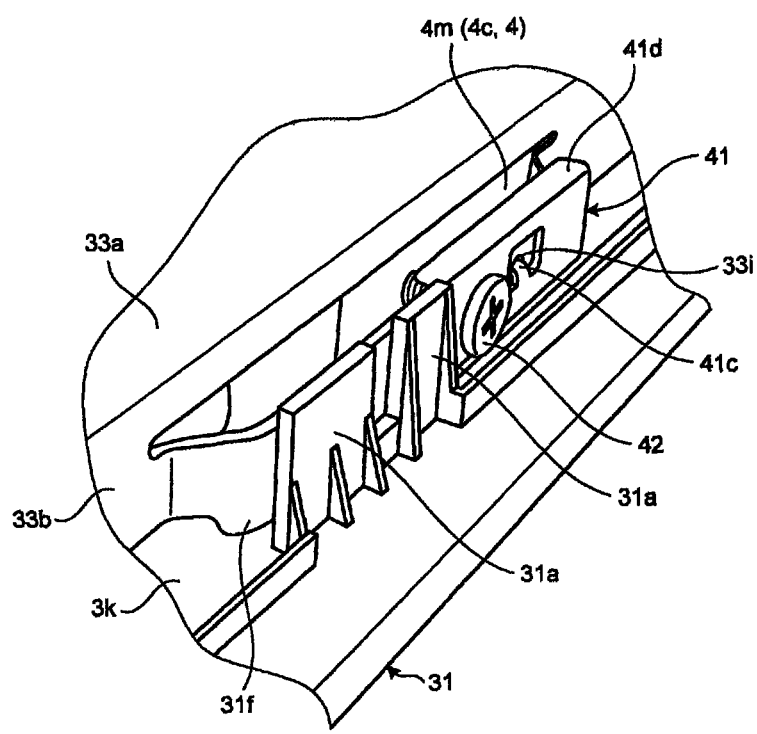
FIG. 15 is an exemplary perspective view illustrating the examples of the first housing member, the display device, and the third housing member of the television receiver in the embodiment when seen from the rear side.
Figure 16:
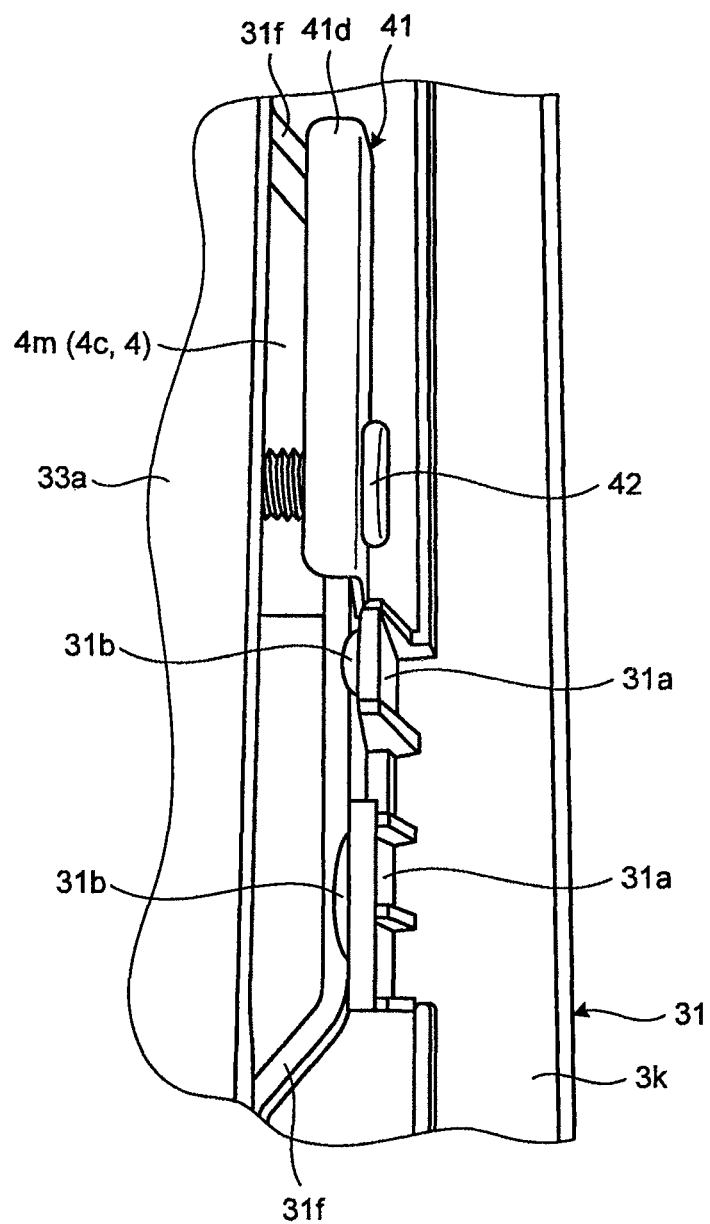
FIG. 16 is an exemplary perspective view illustrating the examples of the first housing member, the display device, and the third housing member of the television receiver in the embodiment when seen from the rear side at a different angle from that in FIG. 14.

Furthermore, in the embodiment, engagement parts 31a are provided on a peripheral edge of the wall 3k of the first housing member 31 as illustrated in FIGS. 15 and 16, as an example. The engagement parts 31a engage with the engagement part 33f of the third housing member 33. To be more specific, the engagement parts 31a protrude to the inner side (back side, rear side) of the housing 3 along the engagement part 33f at a position adjacent to the mounting 41 from the peripheral edge of the wall 3k. As illustrated in FIG. 16, claws 31b are provided on front ends of the engagement parts 31a. The claws 31b and the engagement part 33f are engaged with each other so that the first housing member 31 and the third housing member 33 are joined to each other.

Figure 20:
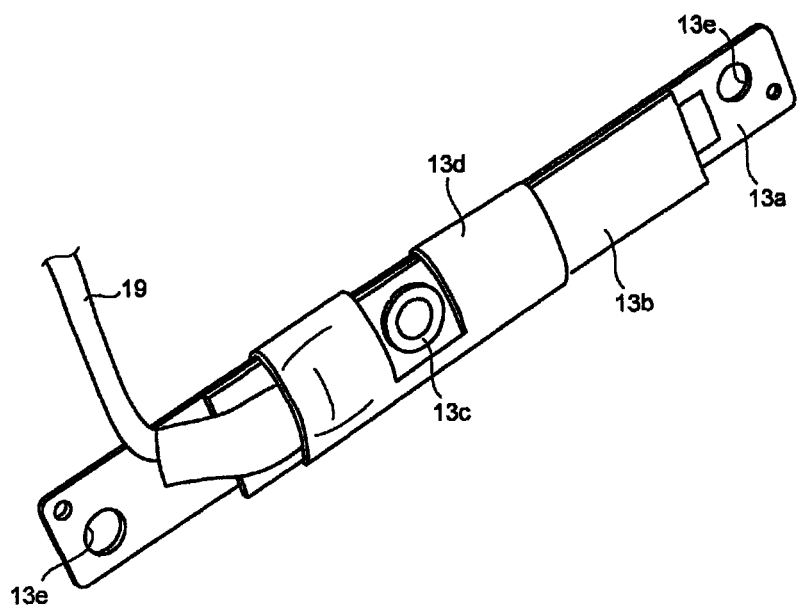
FIG. 20 is an exemplary perspective view illustrating an example of a camera module of the television receiver in the embodiment.
Figure 21:
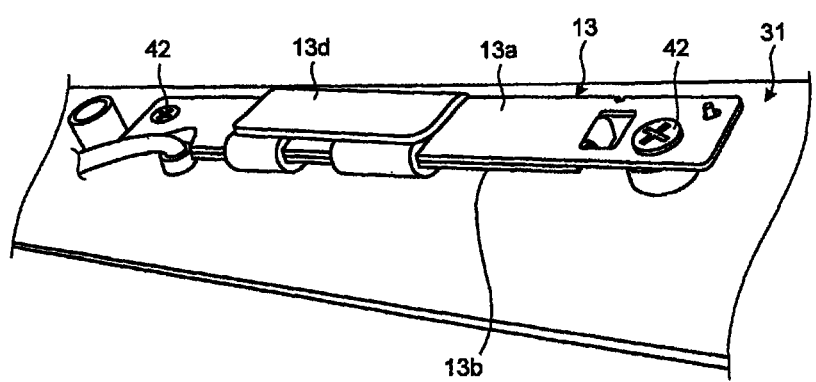
FIG. 21 is an exemplary perspective view illustrating a portion of the example of the first housing member on which the camera module is supported in the television receiver in the embodiment.

Furthermore, in the embodiment, the camera module 13 is joined to the first housing member 31 with the fixtures 42 such as screws as illustrated in FIG. 21, as an example. In the embodiment, the camera module 13 comprises a base 13a, a substrate 13b (a circuit substrate), and a camera 13c as illustrated in FIG. 20, as an example. The base 13a is configured to be in a band-like (stripe) form and a plate form extending along the end 3c of the housing 3. The base 13a is formed by a material having a relatively high rigidity, for example, a metal material such as stainless steel. The substrate 13b is configured to be in a band-like (stripe) form and a plate form extending along the end 3c of the housing 3. Note that the substrate 13b is shorter than the base 13a. That is to say, the base 13a extends to both sides of the substrate 13b in the longitudinal direction. Furthermore, the camera 13c is fixed to the substrate 13b. The substrate 13b is fixed to the base 13a with a fixing member such as a tape 13d. Openings 13e through which the fixtures 42 are inserted are provided on the portions on which the base 13a extends with respect to the substrate 13b. The openings 13e are through holes or notches, for example. In the embodiment, the openings 13e are through holes, as an example. With this configuration, the camera module 13 with a relatively simple structure can be obtained, as an example. In addition, the substrate 13b is attached to the base 13a so that rigidity of the camera module 13 is easy to be made higher, as an example.

Figure 22:
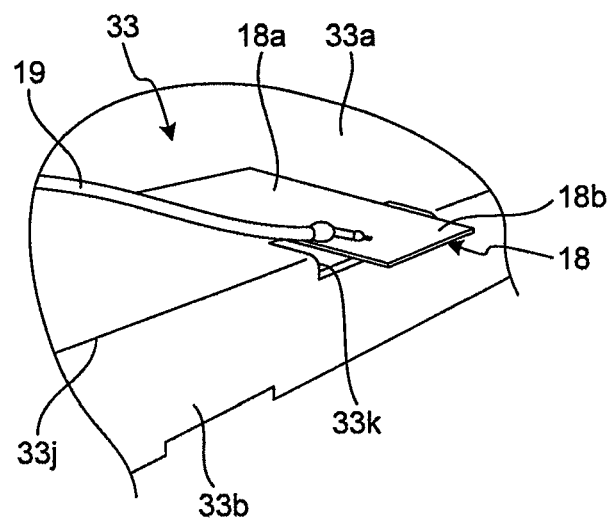
FIG. 22 is an exemplary perspective view illustrating a portion of the example of the third housing member on which an antenna is supported in the television receiver in the embodiment.

Furthermore, in the embodiment, openings 33k are provided on an end 33j as a boundary portion between the wall 33a and the wall 33b of the third housing member 33 as illustrated in FIG. 22, as an example. The openings 33k are through holes or notches, for example. In the embodiment, the openings 33k are through holes, as an example. The antennas 18 are fixed to portions of the third housing member 33 on which the openings 33k are provided. The antennas 18 are configured to have rectangular shapes (in the embodiment, oblong figures as an example) when the display screen 4a is seen from the front side or the rear side. Each antenna 18 comprises a fixing part 18a and a communication module 18b. The communication module 18b is preferably separated from a conductive material such as a metal. In the embodiment, the edge of the third housing member 33 is retreated to the center side of the wall 33a by amounts of the openings 33k, as an example. Therefore, protrusion amounts of the antennas 18 from the end 33j of the third housing member 33 are easy to be smaller. It is to be noted that as illustrated in FIGS. 8 and 9, in the embodiment, a plurality of (in the embodiment, two as an example) antennas 18 are provided as an example. The antennas 18 may be antennas 18 of which communication systems are different from each other or may be distinguished into an antenna for transmission and an antenna for reception. Moreover, the antennas 18 may be used as space diversities.

Figure 23:
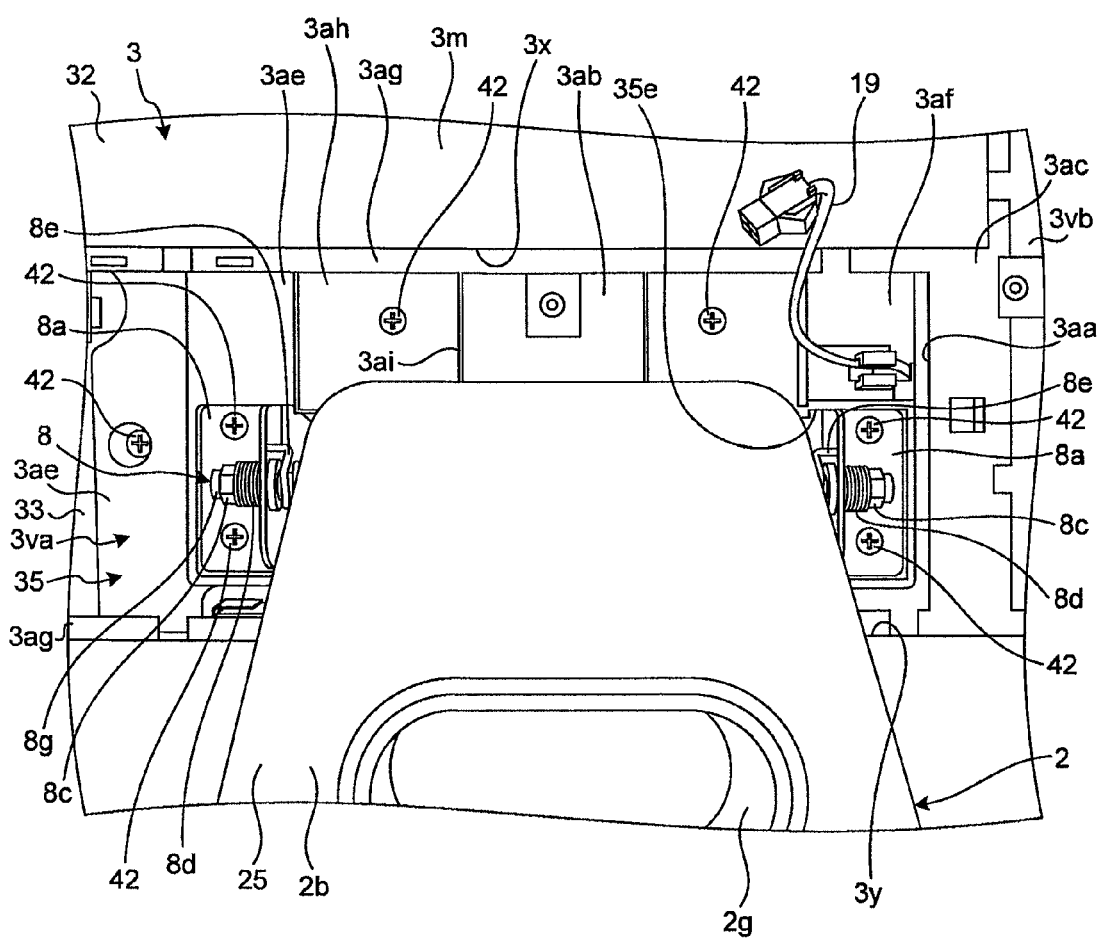
FIG. 23 is an exemplary rear view illustrating an example of a joining portion between the housing and a support in the television receiver in the embodiment.
Figure 24:
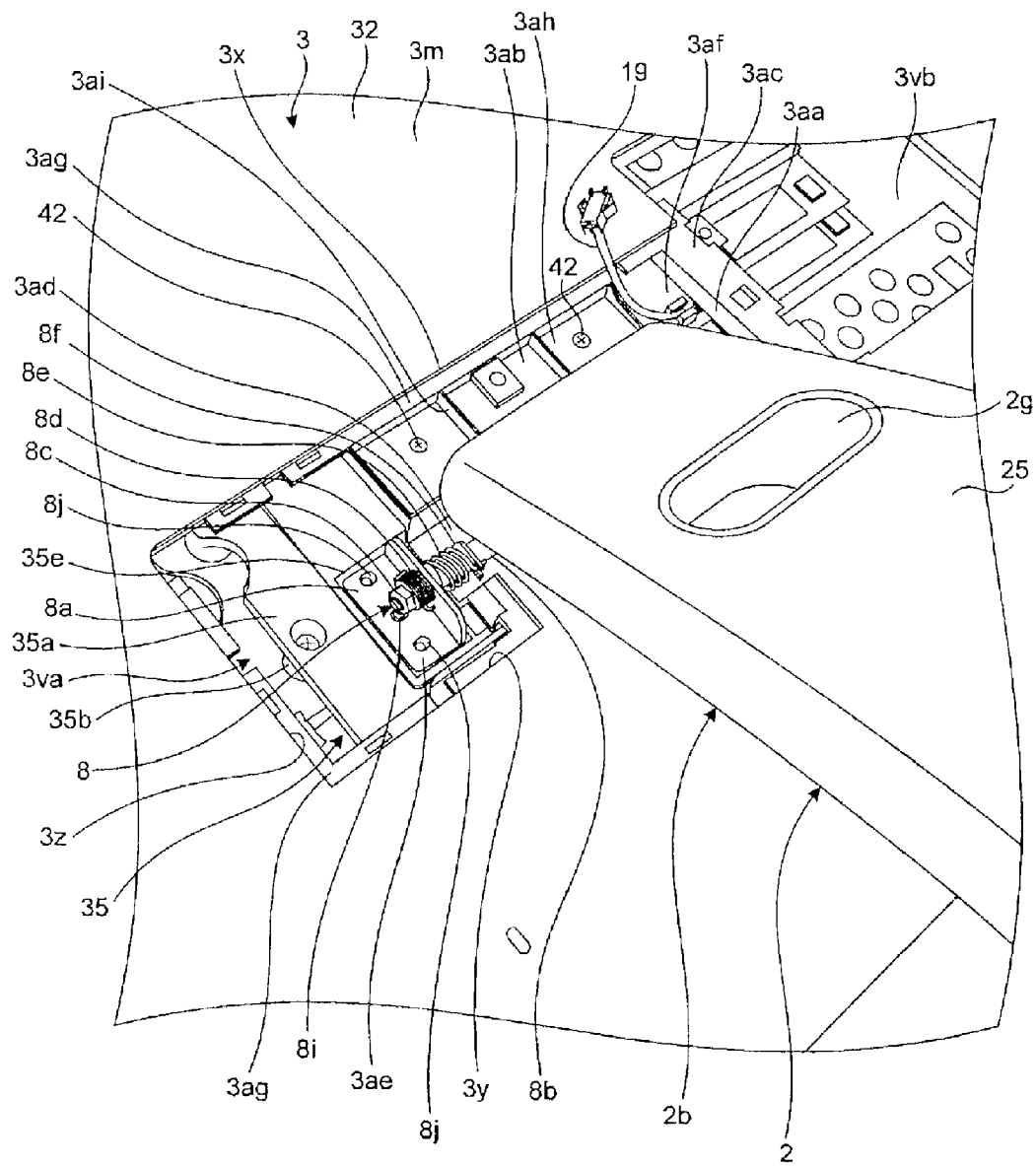
FIG. 24 is an exemplary perspective view illustrating the example of the joining portion between the housing and the support in the television receiver in the embodiment.
Figure 25:
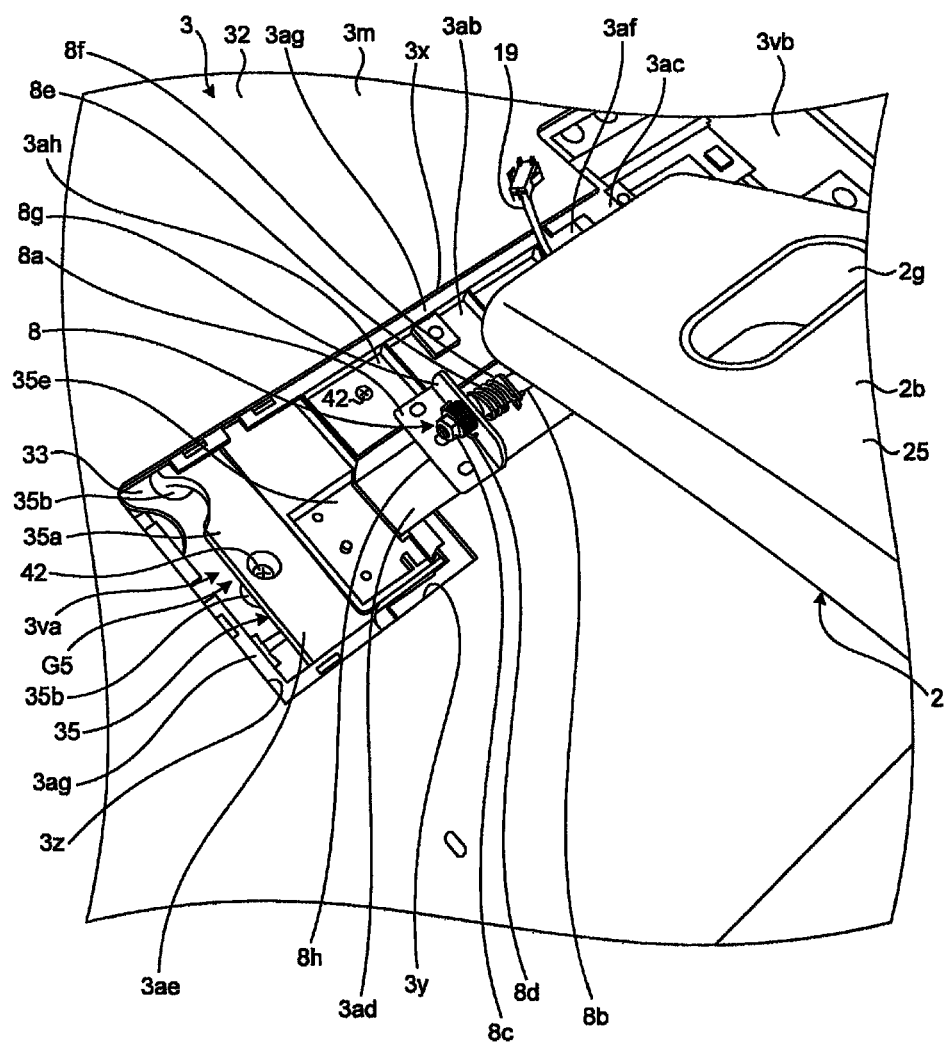
FIG. 25 is an exemplary exploded perspective view illustrating the example of the joining portion between the housing and the support in the television receiver in the embodiment.

Next, an example of a joining portion between the housing 3 and the support 2 is described. As illustrated in FIG. 23 to FIG. 25, the support 2 is joined to the fifth housing member 35 of the housing 3 through the hinge 8. The hinge 8 is an example of a joint that joins the support 2 and the fifth housing member 35 to each other. In FIG. 23 to FIG. 25, a state where covers 3wa and 3wb (see FIG. 2) that cover openings 3va and 3vb provided on the wall 3m are detached is illustrated.

As illustrated in FIG. 23 to FIG. 25 and FIG. 29, the hinge 8 comprises a plurality of (to be more specific, two) attachments 8a, a shaft 8b, fasteners 8c, resistance members 8d, biasing members 8e, and engagement modules 8f.

Figure 29:
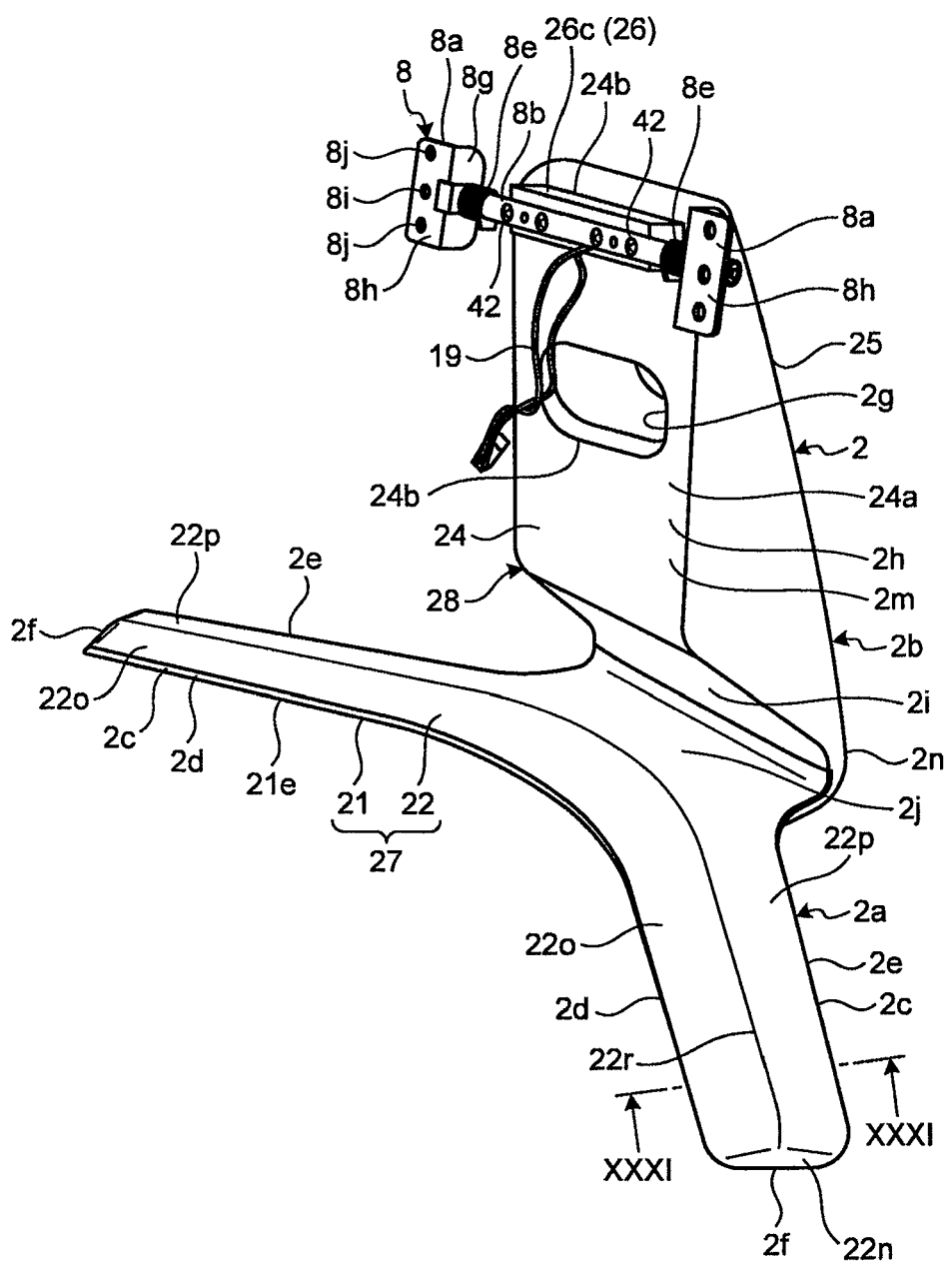
FIG. 29 is an exemplary perspective view illustrating examples of the support and a hinge of the television receiver in the embodiment.

The shaft 8b extends in the right-left direction and connects the two attachments 8a. The shaft 8b is an example of a connection. The shaft 8b is fixed to the support 2 with the fixtures 42 (FIG. 29).

The attachments 8a are attached to right and left ends of the shaft 8b in a rotationally movable manner. As illustrated in FIG. 29, each attachment 8a comprises a wall 8g through which the shaft 8b is inserted and a wall 8h that is bent from the wall 8g and fixed to the fifth housing member 35. A positioning part 8i and holes 8j are provided on the wall 8h. The positioning part 8i is a hole as an example. Two holes 8j are provided to be aligned at upper and lower positions. The positioning part 8i is located between the two holes 8j.

As illustrated in FIG. 25, the resistance members 8d are located at the outer sides (end sides of the shaft 8b in a shaft direction) of the walls 8g. The resistance members 8d are prevented from being disengaged using the fasteners 8c. The resistance members 8d are coil springs (compression springs), as an example. The resistance members 8d act as rotational movement resistances of the attachments 8a with respect to the shaft 8b. An angle of the housing 3 is held by the rotational movement resistances of the resistance members 8d. On the other hand, the biasing members 8e and the engagement parts 8f are located at the inner sides (center sides of the shaft 8b in the shaft direction) of the walls 8g. The engagement parts 8f are plate-like members, as an example. The engagement parts 8f are fixed to the shaft 8b. The biasing members 8e are torsion coil springs, as an example and are joined to the engagement parts 8f and the walls 8g. The biasing members 8e bias the attachments 8a in a direction that the housing 3 is inclined rearward (in a counterclockwise direction in FIG. 3). With this, a force required for an operator when the operator inclines the housing 3 rearward is small.

Figure 26:
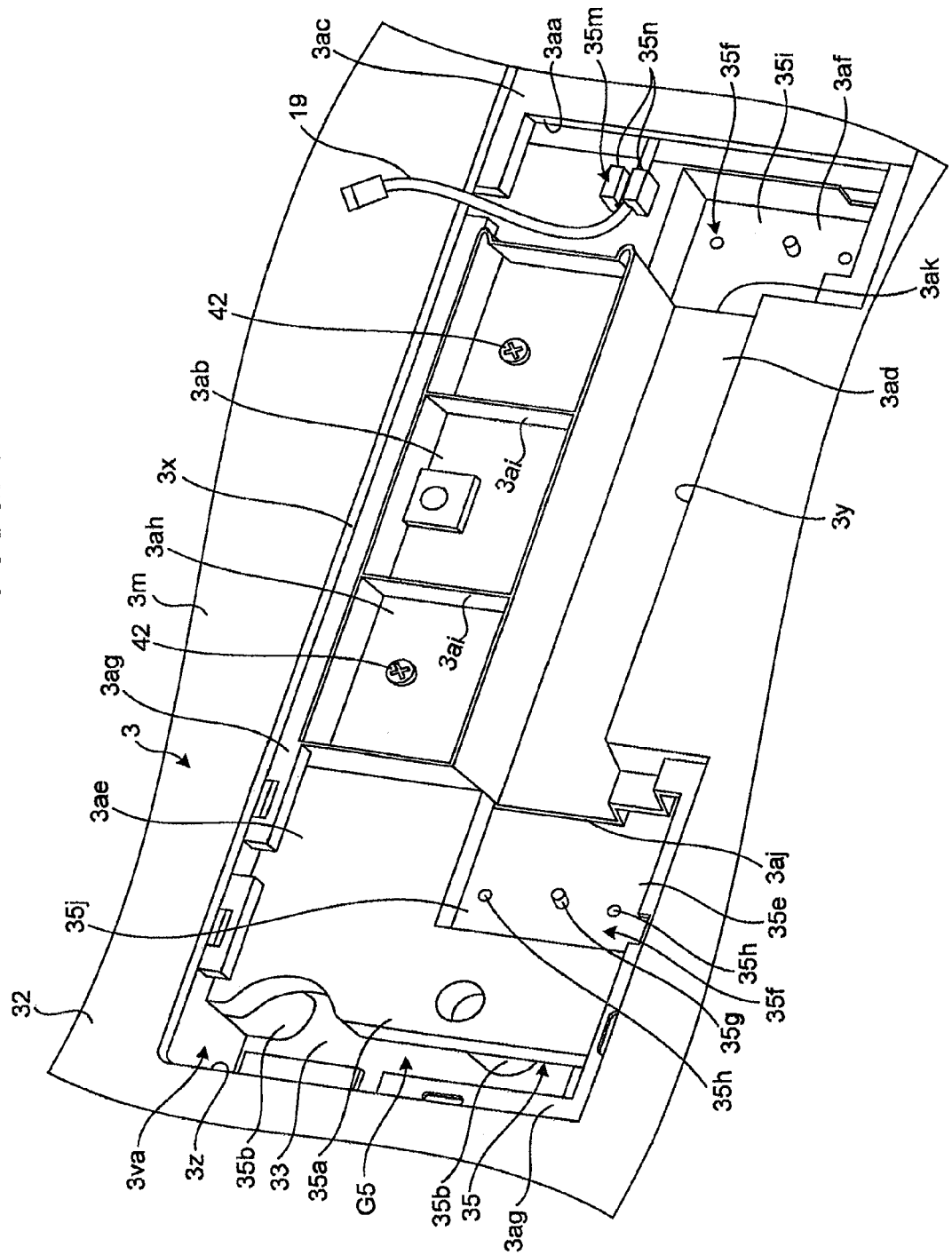
FIG. 26 is an exemplary perspective view illustrating a part of examples of a second housing member and a fifth housing member of the television receiver in the embodiment.

As illustrated in FIG. 26 and the like, the fifth housing member 35 is fixed to the third housing member 33 at a position at which the fifth housing member 35 faces the opening 3va on the wall 3m of the housing 3. The fifth housing member 35 is located at the side opposite to the display device 4 with respect to the third housing member 33. The fifth housing member 35 is located at the rear surface 4b side of the display device 4.

As illustrated in FIGS. 27 and 28, the fifth housing member 35 comprises the base portion 35a and the protrusions 35b.

The base portion 35a is formed in a plate-like form, as an example. A recess 35e that is recessed toward the display device 4 is provided on a back surface 35d (a rear surface, a surface, a section) of the base portion 35a. The recess 35e is an example of a second recess. A plurality of (to be more specific, two) fixing parts 35f are provided on the recess 35e. The fixing parts 35f are provided on right and left ends 35i and 35j of the recess 35e. The fixing parts 35f are examples of a first fixing part. The attachments 8a of the hinge 8 are fixed to the fixing parts 35f. To be more specific, positioning parts 35g and fixing parts 35h are provided on the fixing parts 35f. The positioning parts 35g are protrusions (protrusions, pins) as an example and are inserted into the positioning parts 8i of the hinge 8. The fixing parts 35h are threaded holes, as an example. Two fixing parts 35h are provided to be aligned at upper and lower positions. Each positioning part 35g is located between the two fixing parts 35h. The fixtures 42 that are inserted through the holes 8j of the hinge 8 are fixed to the fixing parts 35h.

Furthermore, fixing parts 35k to which the module 16 is fixed are provided on the base portion 35a. To be more specific, a plurality of (to be more specific, two) fixing parts 35k are provided on a lower edge of the recess 35f along the right-left direction. Threaded holes 35l are provided on the fixing parts 35k. Furthermore, the fixtures 42 that penetrate through the module 16 are joined to the threaded holes 35l so that the module 16 is fixed to the fixing parts 35k. The fixing parts 35k are examples of a second fixing part.

Furthermore, a holding part 35m that holds the harnesses 19 is provided on the fifth housing member 35 as illustrated in FIG. 27. The holding part 35m holds the harnesses 19 while sandwiching the harnesses 19 with two holding pieces 35n.

As illustrated in FIG. 28, the protrusions 35b protrude to the display device 4 side from a front surface 35c (a front face, a surface, a section) of the base portion 35a. The protrusions 35b are formed into cylindrical shapes, as an example. An inner side of each protrusion 35b has a two-stage structure in which inner diameters are different. With this, a step is provided in each protrusion 35b. The fifth housing member 35 is fixed to the third housing member 33 with the fixtures 42 (FIG. 25) which engage with the steps. A gap G5 is provided between the base portion 35a of the fifth housing member 35 that is fixed to the third housing member 33 and the third housing member 33 (see FIG. 25). The air flows in the gap G5 with an operation of the fan 9.

As illustrated in FIG. 23 to FIG. 26, the opening 3va from which the fifth housing member 35 is exposed is provided on the wall 3m of the second housing member 32. The opening 3va is arranged in parallel with another opening 3vb through a partition portion 3ac.

The opening 3va accommodates at least a part of the hinge 8 and makes at least a part of the fifth housing member 35 expose therefrom. In the embodiment, the opening 3va accommodates at least the shaft 8b of the hinge 8 and makes at least the right and left ends of the base portion 35a of the fifth housing member 35 expose therefrom. As illustrated in FIG. 26, the opening 3va is formed to have a substantially rectangular shape when seen from the rear side. The opening 3va comprises a first edge 3x (upper edge), a second edge 3y (lower edge), a third edge 3z (one side edge), and a fourth edge 3aa (the other side edge) as four edges. The first edge 3x and the second edge 3y are opposed to each other in a separation manner. The third edge 3z and the fourth edge 3aa are opposed to each other in a separation manner and connect the first edge 3x and the second edge 3y. The fourth edge 3aa is provided on the partition portion 3ac. Furthermore, flanges 3ag that support the cover 3wa are provided on the edges of the opening 3va.

An extending portion (a wall portion, a wall, a section) 3ab is provided on the opening 3va. The extending portion 3ab is provided between the edges of the opening 3va. To be more specific, the extending portion 3ab is provided between the first edge 3x and the second edge 3y. The extending portion 3ab is an example of a portion of the second housing member 32. The extending portion 3ab is located between the support 2 and the fifth housing member 35. The extending portion 3ab as a part of the housing 3 extends to the inside of the opening 3va and is covered by the support 2.

A recess 3ad is provided on the extending portion 3ab. The recess 3ad is an example of a first recess. The recess 3ad extends in the right-left direction. The recess 3ad is recessed toward the display device 4. The recess 3ad accommodates at least a part of the hinge 8 (FIG. 24). To be more specific, the recess 3ad accommodates the shaft 8b of the hinge 8. The recess 3ad is overlapped with the recess 35e of the fifth housing member 35. At least a part of the recess 3ad is accommodated in the recess 35e. The recess 3ad may abut against the recess 35e or may be separated from the recess 35e.

The extending portion 3ab comprises a fixing part 3ah. The fixing part 3ah is located at an upper side of the recess 3ad. The fixing part 3ah is joined (fixed) to the fifth housing member 35 with the fixtures 42 (screws). In the embodiment, two fixtures 42 that join (fix) the fixing part 3ah to the fifth housing member 35 are used, as an example. Furthermore, ribs 3ai are provided between the two fixtures 42 on the fixing part 3ah.

As illustrated in FIG. 26, the opening 3va is divided into three of an opening 3ae, the recess 3ad (opening), and an opening 3af by the extending portion 3ab. One end of the recess 3ad communicates with the opening 3ae and the other end thereof communicates with the opening 3af. The opening 3ae is an opening defined by an edge 3aj of the extending portion 3ab, the edge 3z of the opening 3va, and the like. The opening 3af is an opening defined by an edge 3ak of the extending portion, the edge 3aa of the opening 3va, and the like. At least one of the hinge 8 and the fifth housing member 35 is provided between the openings 3ae and 3af. In the embodiment, the shaft 8b of the hinge 8 is inserted through the openings 3ae and 3af as illustrated in FIG. 23, as an example. The openings 3ae and 3af make the attachments 8a of the hinge 8 expose therefrom. Furthermore, the openings 3ae and 3af make the fixing parts 35f of the fifth housing member 35 expose therefrom in a state where the hinge 8 is detached from the fifth housing member 35. The extending portion 3ab is located between the support 2 and the fifth housing member 35 between the openings 3ae and 3af.

Then, the support 2 is described. As illustrated in FIG. 29, the support 2 comprises a ground portion 2a (a first portion) and an erected portion 2b (a second portion). The support 2 is an example of a stand section. The support 2 supports the housing 3 at the rear surface 4b side of the display device 4.

Figure 30:
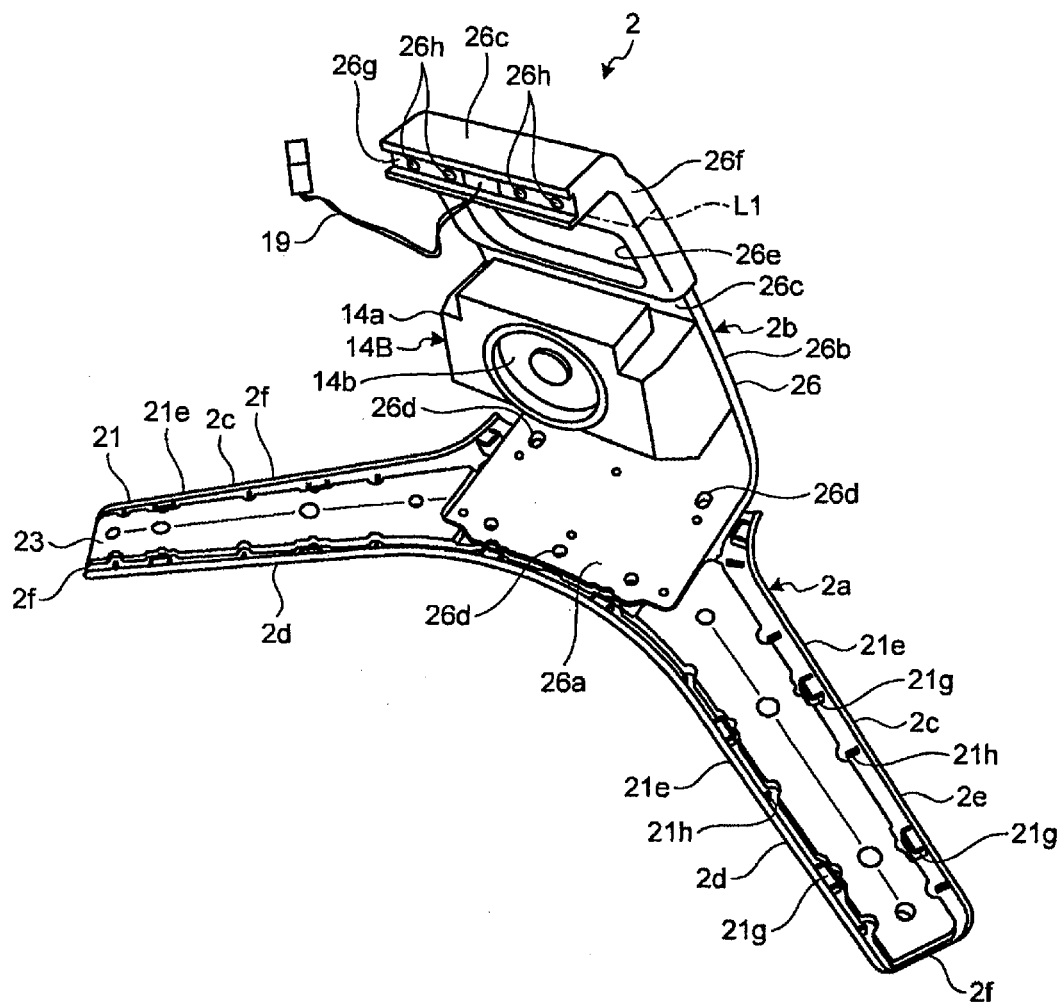
FIG. 30 is an exemplary perspective view illustrating a part of the example of the support of the television receiver in the embodiment.
Figure 31:
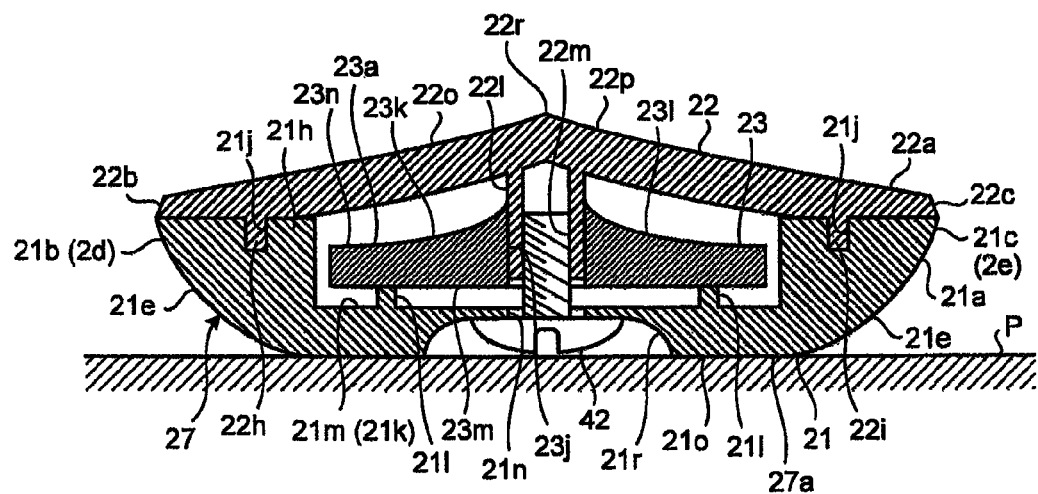
FIG. 31 is an exemplary cross-sectional view cut along a line XXXI-XXXI in FIG. 29 in the embodiment.

As illustrated in FIG. 29 to FIG. 31, the ground portion 2a comprises a first supporting member 21 (a cover, an under cover), a second supporting member 22 (a cover, an upper cover), and a third supporting member 23 (a bottom wall, a wall, an incorporated part, a reinforcing part, a support, a framework member, a metal portion, a frame, a framework member, a base). The first supporting member 21 covers at least a part of the third supporting member 23 at the outer side with respect to the third supporting member 23.

The first supporting member 21 and the second supporting member 22 constitute a cover member 27 (an accommodation module, a case) that covers (accommodates) the third supporting member 23. The cover member 27 covers a bottom surface 23m (FIG. 31) of the third supporting member 23. The cover member 27 is formed by a resin as an example, the third supporting member 23 is formed by a metal as an example. The cover member 27 has rigidity lower than that of the third supporting member 23. As illustrated in FIG. 31, the cover member 27 covers at least a part of at least the third supporting member 23 at an external placement surface P side when the ground portion 2a is placed on the external placement surface P (horizontal surface) and comprises a region 27a (a bottom wall, a wall, a region, a portion, a rubber leg, a leg (FIG. 31)) facing the external placement surface P. Furthermore, the cover member 27 comprises inclined portions 21e (flared portions, bottom walls, edge portions, designing portions) that are inclined in a direction away from the external placement surface P when the ground portion 2a is placed on the external placement surface P. The inclined portions 21e maybe curved as an example, or may have a constant angle (45 degrees, as an example) with respect to the external placement surface P as another example.

On the other hand, as illustrated in FIGS. 29 and 30, the erected portion 2b comprises a fourth supporting member 24 (a cover, a front cover), a fifth supporting member 25 (a cover, a rear cover), and a sixth supporting member 26 (a frame, a framework member, a base). The erected portion 2b is connected to the housing 3 at the rear surface 4b side of the display device 4 so as to connect the housing 3 and the ground portion 2a to each other.

Hereinafter, parts of the ground portion 2a and the erected portion 2b are described in detail.

As illustrated in FIG. 29, the cover member 27 comprises extending portions 2c extending along the external placement surface P when the cover member 27 is placed on the external placement surface P. Two extending portions 2c are provided, as an example. These extending portions 2c are connected to each other on a connection 2j. The inclined portions 21e are provided on ends 2d and 2e of the extending portions 2c in the transverse direction. That is to say, the inclined portions 21e are provided at least on the ground portion 2a at the front (front surface) side of the display screen 4a. The cover member 27 comprises the first supporting member 21 and the second supporting member 22 and covers the third supporting member 23. When the cover member 27 is placed on the external placement surface P, the first supporting member 21 is located at the external placement surface P side of the third supporting member 23 and the second supporting member 22 is located at the side opposite to the first supporting member 21. The first supporting member 21 and the second supporting member 22 are fixed to each other with the fixtures 42 (FIG. 31).

Figure 32:
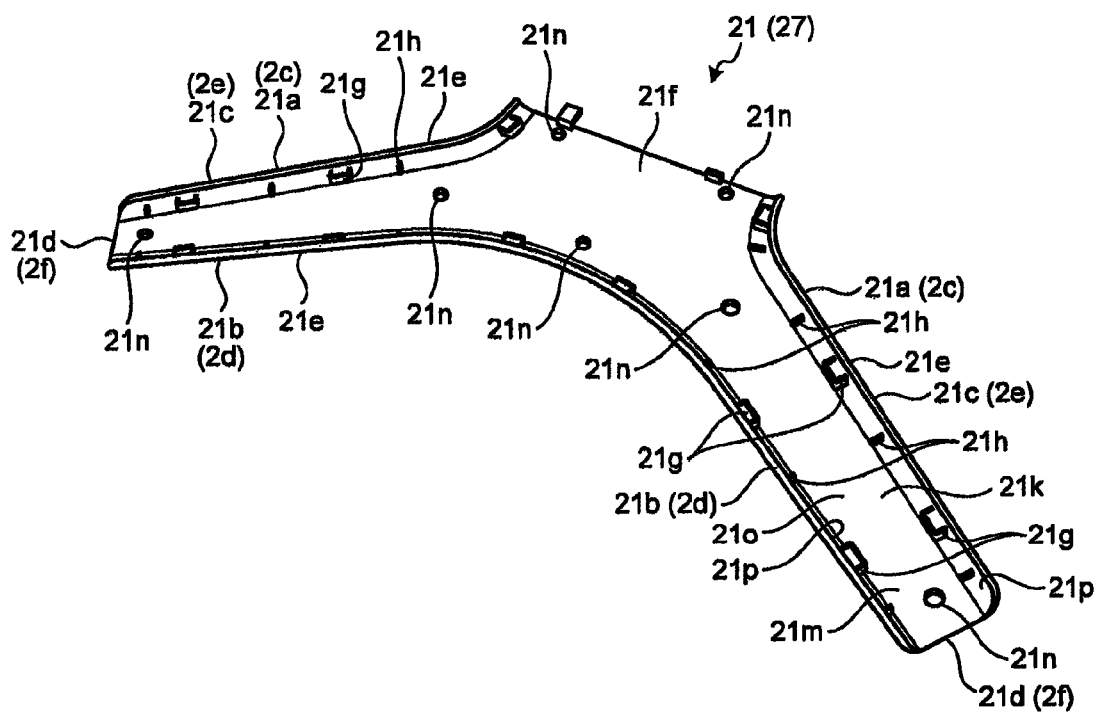
FIG. 32 is an exemplary perspective view illustrating the example of a first supporting member of the television receiver in the embodiment when seen from the above.

As illustrated in FIG. 32, the first supporting member 21 comprises a pair of extending portions 21a. The extending portions 21a are connected to each other on a connection 21f. The extending portions 21a comprise ends 21b and 21c in the transverse direction and ends 21d (front ends) in the longitudinal direction. The first supporting member 21 comprises a bottom portion 210 (a bottom wall, a wall portion, a wall, a section) and the inclined portions 21e are provided at front and rear edges of the bottom portion 21o. The inclined portions 21e are erected from the bottom portion 21o. When the ground portion 2a is placed on the external placement surface P, the inclined portions 21e are flared in a direction away from the external placement surface P. It is to be noted that the inclined portions 21e may extend to the second supporting member 22. A recess 21k is provided on the first supporting member 21 at the second supporting member 22 side. The third supporting member 23 is accommodated in the recess 21k (FIG. 31).

Ribs 211 are provided on the recess 21k, as illustrated in FIG. 31. Furthermore, holes 21n are provided on bottom portion 21m (a bottom, a portion, a wall, a wall portion) of the recess 21k constituting the bottom portion 21o. The holes 21n are examples of a first opening. The holes 21n are provided on a recess 21r provided on the bottom portion 21o. The recess 21r accommodates the fixtures 42.

Figure 33:
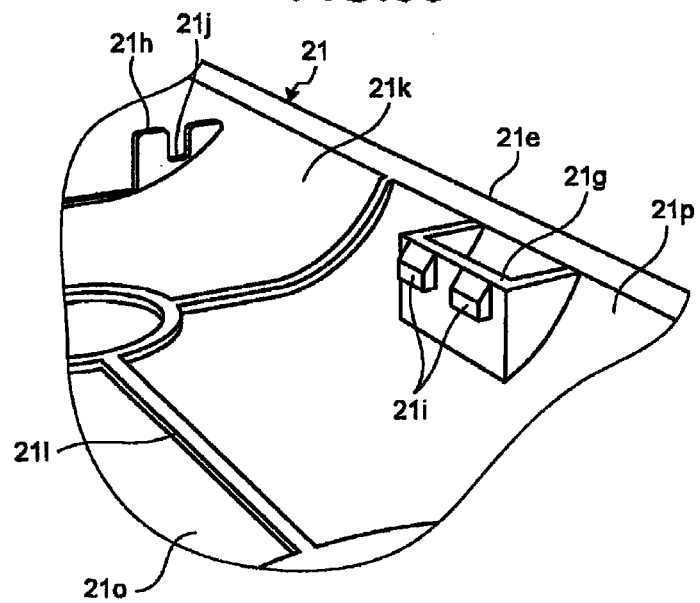
FIG. 33 is an exemplary perspective view illustrating a part of the example of the first supporting member of the television receiver in the embodiment when seen from the above.

Furthermore, a plurality of engagement parts 21g and 21h are provided on inner surfaces 21p (rear surfaces, surfaces, portions) of the inclined portions 21e. The engagement parts 21g and 21h are located so as to be spaced from each other along the ends 21b and 21c of the extending portions 21a. As illustrated in FIG. 33, each engagement part 21g comprises a pair of claws 21i. Each engagement part 21h comprises a trench 21j.

Figure 34:
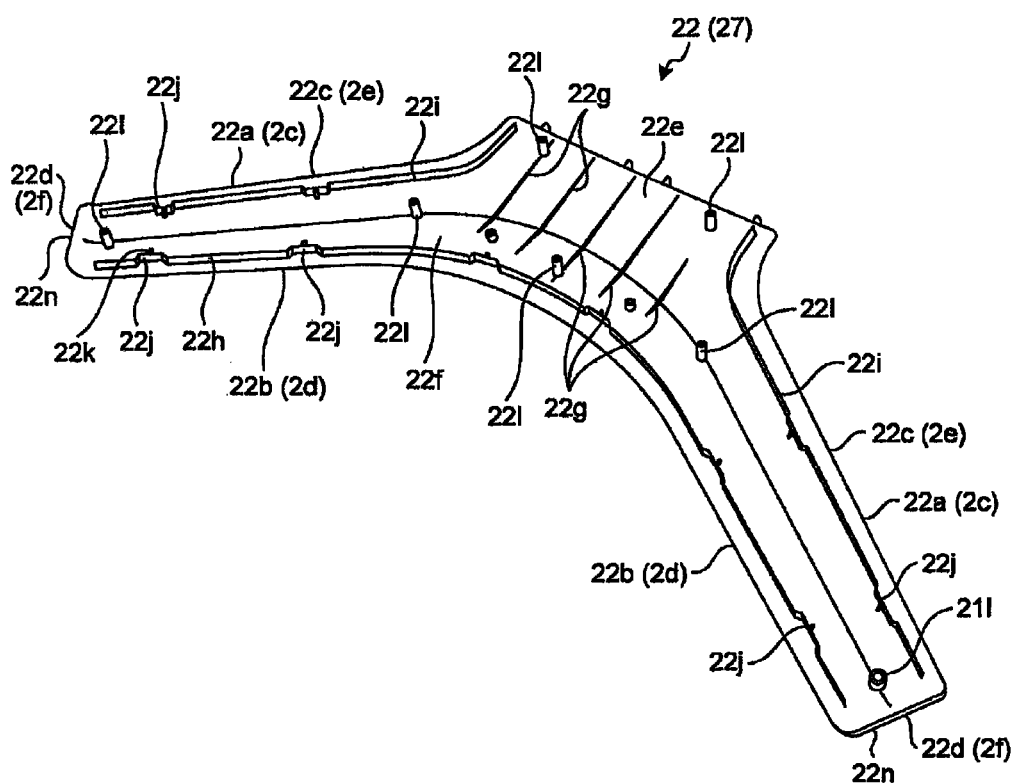
FIG. 34 is an exemplary perspective view illustrating an example of a second supporting member of the television receiver in the embodiment when seen from the bottom side.

As illustrated in FIG. 34, the second supporting member 22 comprises a pair of extending portions 22a. The extending portions 22a are connected to each other on a connection 22e. The extending portions 22a comprise ends 22b and 22c in the transverse direction and ends 22d (front ends) in the longitudinal direction. The second supporting member 22 covers the recess 21k of the first supporting member 21.

Figure 36:
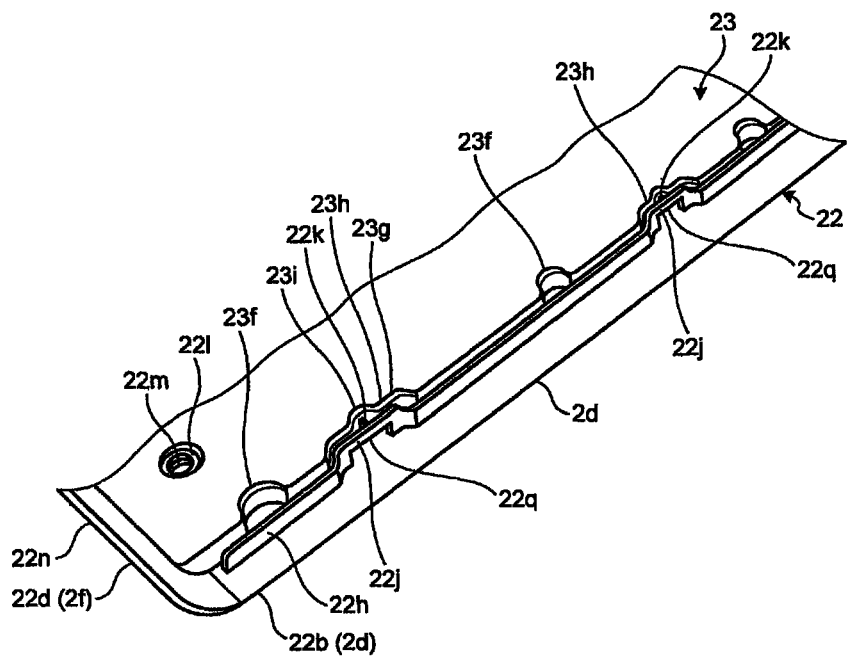
FIG. 36 is an exemplary perspective view illustrating a part of an example of a state where the third supporting member is overlapped with the second supporting member in the television receiver in the embodiment when seen from the rear side.

Ribs 22g, 22h, and 22i (reinforcing portions, walls, portions) are provided on an inner surface 22f (a rear surface, a lower surface, a section) of the second supporting member 22. The ribs 22g are provided on the connection 22e. The ribs 22h are provided along the ends 22b of the extending portions 22a. The ribs 22i are provided along the ends 22c of the extending portions 22a. The third supporting member 23 is accommodated between the ribs 22h and 22i. The ribs 22h and 22i engage with the engagement parts 21j of the first supporting member 21 (FIG. 31). A plurality of engagement parts 22j are provided on the ribs 22h and 22i. The engagement parts 22j are provided so as to be spaced from each other along the longitudinal direction of the ribs 22h and 22i. As illustrated in FIG. 36, the engagement parts 22j protrude toward the third supporting member 23. Ribs 22k and holes 22q are provided on the engagement parts 22j. The pairs of claws 21i of the engagement parts 21g of the first supporting member 21 are engaged with the holes 22q.

Furthermore, as illustrated in FIGS. 34 and 36, engagement parts 22l are provided on the inner surface 22f of the second supporting member 22. The engagement parts 22l are bosses (projections, protrusions), as an example. Threaded holes 22m are provided on the engagement parts. The engagement parts 22l are examples of a first engagement part. It is to be noted that the first engagement part may be provided on the first supporting member 21. That is to say, the first engagement part may be provided on at least one of the first supporting member 21 and the second supporting member 22.

Furthermore, second inclined portions 22n are provided on the ends 22d of the extending portions 22a of the second supporting member 22 in the longitudinal direction. The second inclined portions 22n are flared toward the external placement surface P when the ground portion 2a is placed on the external placement surface P (FIG. 29).

Furthermore, as illustrated in FIG. 31, third inclined surfaces 22o and 22p are provided on the extending portions 22a of the second supporting member 22. The third inclined surfaces 22o and 22p protrude toward a center 22r in the transverse direction from the ends 22b and 22c of the extending portions 22a in the transverse direction. With this, the second supporting member 22 has a shape that is sharpened in a mountain form and makes it possible to make the cover member 27 be seen to be relatively thin. In addition, on the extending portions 22a, the center 22r of the extending portions 22a in the transverse direction is thicker (i.e., having a larger thickness) than the ends 22b and 22c of the extending portion 22a in the transverse direction. The extending portions 22a are supported by the first supporting member 21.

Figure 35:
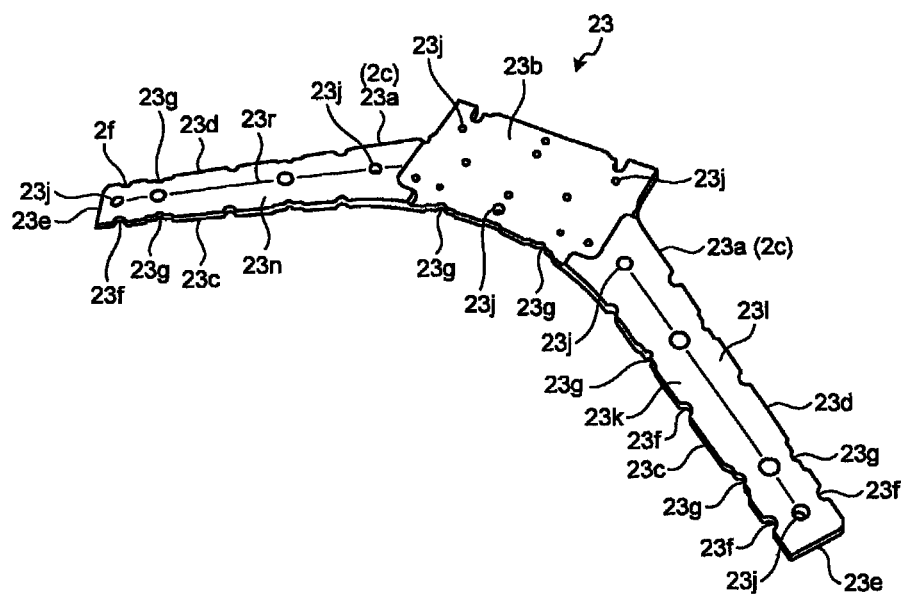
FIG. 35 is an exemplary perspective view illustrating an example of a third supporting member of the television receiver in the embodiment when seen from the above.

As illustrated in FIG. 35, the third supporting member 23 comprises a pair of extending portions 23a. The extending portions 23a are connected to each other on a connection 23b. The connection 23b is formed in a rectangular plate form. The extending portions 23a comprise ends 23c and 23d in the transverse direction and ends 23e (front ends) in the longitudinal direction. A plurality of recesses 23f and 23g are provided on the ends 23c and 23d of the extending portions 23a. The recesses 23f and the recesses 23g are alternately arranged in the longitudinal direction of the extending portions 23a. The recesses 23f are provided so as to escape (accommodate) the engagement parts 21h of the first supporting member 21. The recesses 23g comprise first recesses 23h and second recesses 23i. The recesses 23g are provided so as to escape (accommodate) the engagement parts 22j of the second supporting member 22. The recesses 23g are also provided on the connection 23b.

Furthermore, fourth inclined surfaces 23k and 23l are provided on upper surfaces 23n of the extending portions 23a. The fourth inclined surfaces 23k and 23l protrude toward a center 23r in the transverse direction from the ends 23c and 23d of the extending portions 23a in the transverse direction. On the other hand, the bottom surfaces 23m of the extending portions 23a are formed to be substantially flat.

Furthermore, a plurality of holes 23j are provided on the third supporting member 23. The holes 23j are provided on the pair of the extending portions 23a and the connection 23b. As illustrated in FIG. 31, the engagement parts 22l of the second supporting member 22 are inserted into the holes 23j. Furthermore, the fixtures 42 that are inserted through the holes 21n of the first supporting member 21 are joined to the engagement parts 22l of the second supporting member 22. In this state, the fixtures 42 are inserted through the holes 23j. Note that the fixtures 42 are fixtures that are joined to the second supporting member 22 through the holes 21n provided on the first supporting member 21.

As illustrated in FIG. 29, a first surface 2h and a second surface 2i that extends to the lower side from the first surface 2h are provided on a front surface 2m (a front face, a wall, a wall portion, a section) of the erected portion 2b. The second surface 2i is an inclined surface that is inclined to the rear side toward the lower side. Furthermore, an opening 2g of an erected portion is provided on the erected portion 2b. The opening 2g is provided on the first surface 2h and penetrate through the front surface 2m and a rear surface 2n of the erected portion 2b. A harness, a cable, and the like can be inserted through the opening 2g.

The fourth supporting member 24 comprises the front surface 2m (the first surface 2h, the second surface 2i) of the erected portion 2b. An opening 24b into which a part of the sixth supporting member 26 is inserted is provided on an upper portion of a front wall 24a of the fourth supporting member 24. The fourth supporting member 24 is formed by a resin, as an example. On the other hand, the fifth supporting member 25 comprises the rear surface 2n of the erected portion 2b. The fifth supporting member 25 is formed by a resin, as an example. The fourth supporting member 24 and the fifth supporting member 25 constitute a second cover member 28 that covers (accommodates) the sixth supporting member 26.

As illustrated in FIG. 30, the sixth supporting member 26 comprises a base portion 26a, a wall 26b, and an attachment 26c. The sixth supporting member 26 is formed by a metal, as an example. On the sixth supporting member 26, a region 26f at an upper side with respect to a dashed line L1 in FIG. 30 is coated by substantially the same color as the fourth supporting member 24.

The base portion 26a is placed on the connection 23b of the third supporting member 23. Holes 26d are provided on the base portion 26a. The base portion 26a is sandwiched between the first supporting member 21 and the second supporting member 22 in a state where the engagement parts 22l of the second supporting member 22 are inserted through the holes 26d. To be more specific, the third supporting member 23 is interposed between the base portion 26a and the first supporting member 21. With this configuration, the sixth supporting member 26 (the erected portion 2b) is joined (fixed) to the ground portion 2a. An opening 26e is provided on the erected wall 26b. The opening 26e constitutes the opening 2g.

The wall 26b extends to the upper side from a rear end of the base portion 26a. A speaker 14B is attached to a front surface 26c of the wall 26b.

Figure 37:
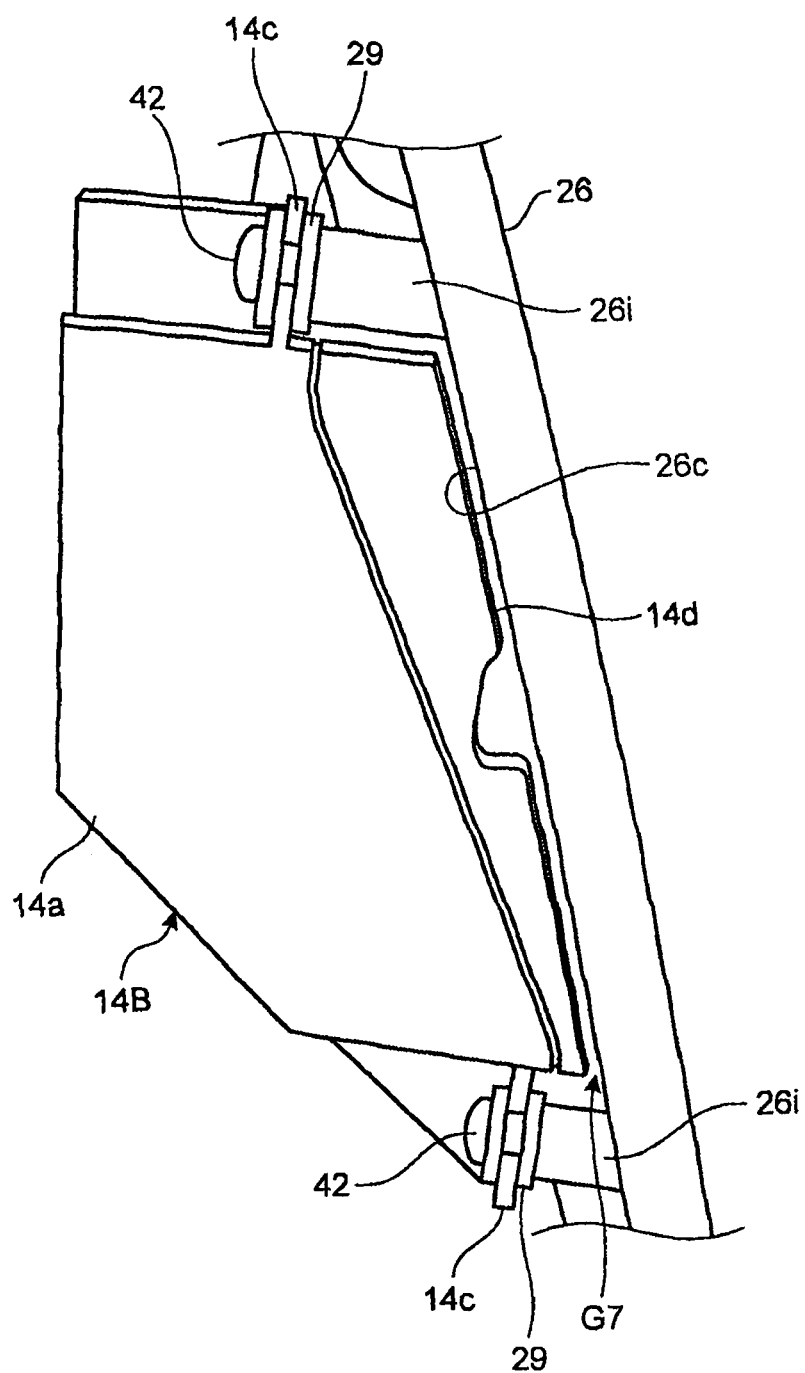
FIG. 37 is an exemplary side view illustrating a sixth supporting member and a speaker of the television receiver in the embodiment.

The speaker 14B is an accommodation part (a part, a member) accommodated in the erected portion 2b. The speaker 14B is opposed to the housing 3. It is to be noted that the speaker 14B may be located at a lower side of the housing 3 so as not to be opposed to the housing 3. The speaker 14B comprises a cabinet 14a (a housing, a frame) and a unit 14b that is accommodated and held in the cabinet 14a and emits sound. The unit 14b is opposed to the back surface 3b of the housing 3. The unit 14b emits sound toward the front side (toward the housing 3). As illustrated in FIG. 37, attachments 14c are provided on the cabinet 14a of the speaker 14B. The attachments 14c are joined (fixed) to a fixing parts 26i provided on the front surface 26c of the wall 26b through interposing members 29 with the fixtures 42. The fixing parts 26i are bosses on which threaded holes are provided as an example and the fixtures 42 are screws. The interposing members 29 are elastic members, as an example, and absorb vibration of the speaker 14B. A gap G7 is provided between a rear surface 14d of the cabinet 14a and the front surface 26c of the erected wall 26b. This suppresses the vibration of the speaker 14B from being transmitted to the longitudinal wall 26b.

As illustrated in FIG. 30, the attachment 26c extends to the front side from an upper end of the wall 26a. A trench 26g is provided on the attachment 26c. The shaft 8b of the hinge 8 is inserted into the trench 26g. Screw holes 26h (fixing parts, supports) are provided on the trench 26g. Furthermore, the fixtures 42 that penetrate through the shaft 8b are joined to the threaded holes 26h so that the shaft 8b (hinge 8) is fixed to the attachment 26c. As illustrated in FIG. 29, the harnesses 19 extend from the attachment 26c. The harnesses 19 are connected to the speaker 14B. At least a part of the attachment 26c is accommodated in the recess 3ad. The attachment 26 is a portion of the support 2 that is connected to the housing 3 through the opening 3va.

Figure 38:
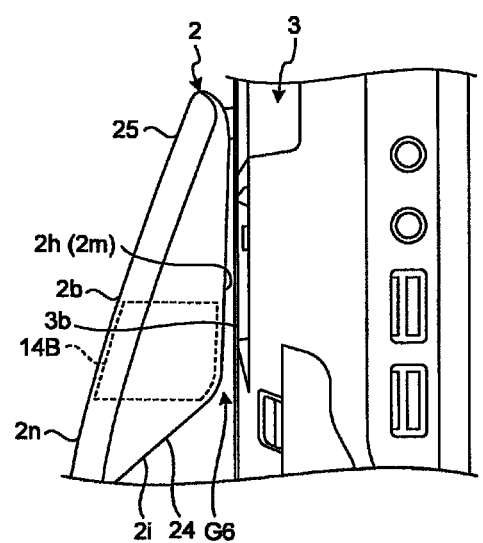
FIG. 38 is an exemplary side view illustrating a part of the support and the housing of the television receiver in the embodiment.

Furthermore, in the embodiment, a gap G6 is provided between the first surface 2h (the front surface 2m) of the erected portion 2b of the support 2 and the back surface 3b of the housing 3 in a state where the back surface 3b of the housing 3 is the closest to the first surface 2h of the erected portion 2b of the support 2, as illustrated in FIG. 38. That is to say, the support 2 supports the housing 3 through the hinge 8 in a rotationally movable manner in a range where the housing 3 does not hit the first surface 2*h* (the front surface 2*m*) of the erected portion 2*b*.

As described above, in the embodiment, the extending portion 3*ab* that is located between the support 2 and the fifth housing member 35 is provided on the second housing member 32 so as to connect between the first edge 3*x* and the second edge 3*y* of the opening 3*va*. Accordingly, the rigidity of the housing 3 (the second housing member 32) can be made higher as an example. Therefore, as an example, the periphery of the opening 3*va* can be suppressed from being deformed and the number of fixtures 42 that join the second housing member 32 and the fifth housing member 35 on the periphery of the opening 3*va* is relatively small.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display;
a housing configured to accommodate at least a part of the display;
a support configured to support the housing;
a first member in the housing;
a joint configured to join the support and the first member; and
a second member in the housing, the second member comprising a plurality of openings and a wall between the support, the first member, and the openings, and at least one of the joint and the first member are between the openings, wherein
the wall comprises a first recess recessed toward the display, the first recess configured to accommodate at least a part of the joint,
the first member comprises a second recess recessed toward the display, and
the first member and the second member overlaps each other at the second recess and the first recess.

2. An electronic apparatus comprising:
a display;
a housing configured to accommodate at least a part of the display;
a support configured to support the housing;
a first member in the housing;
a joint configured to join the support and the first member; and
a second member in the housing, the second member comprising an opening and a portion between the support and the first member, the portion extending between edges of the opening, wherein
the portion comprises a first recess recessed toward the display, the first recess configured to accommodate at least a part of the joint,
the first member comprises a second recess recessed toward the display, and
the first member and the second member overlaps each other at the second recess and the first recess.

3. The electronic apparatus of claim 2, wherein
the joint comprises a plurality of attachments attached to the first member and a connection configured to connect a first one of the attachments and a second one of the attachments,
the first recess is configured to accommodate the connection, and
the second recess comprises a first fixing part to which the attachments are fixed.

4. The electronic apparatus of claim 2, wherein the first member comprises a base portion and a plurality of protrusions that protrude to a side of the display from the base portion.

5. The electronic apparatus of claim 4, further comprising a third member between the display and the first member, wherein a gap is between the third member and the base portion.

6. The electronic apparatus of claim 2, wherein the portion is connected to the first member with a fixture.

7. The electronic apparatus of claim 2, further comprising a module in the housing, wherein the first member comprises a fixing part to which the module is fixed.

* * * * *